(12) United States Patent
Matsushima

(10) Patent No.: US 9,746,706 B2
(45) Date of Patent: Aug. 29, 2017

(54) DISPLAY DEVICE AND ELECTRONIC APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 283 days.

(21) Appl. No.: 14/058,971

(22) Filed: Oct. 21, 2013

(65) Prior Publication Data

US 2014/0118639 A1    May 1, 2014

(30) Foreign Application Priority Data

Oct. 26, 2012   (JP) .................................. 2012-236500

(51) Int. Cl.
   *G02F 1/1343*   (2006.01)
   *G02F 1/1333*   (2006.01)
   *G06F 3/044*    (2006.01)

(52) U.S. Cl.
   CPC .... *G02F 1/13338* (2013.01); *G02F 1/134363* (2013.01); *G06F 3/044* (2013.01); *G02F 2001/134318* (2013.01); *G02F 2001/134381* (2013.01)

(58) Field of Classification Search
   CPC ........... G02F 1/134309; G02F 1/13306; G02F 1/13338; G02F 1/134363; G02F 2001/134318; G02F 2001/134381; G06F 3/044
   USPC ....................................................... 349/141
   See application file for complete search history.

(56) References Cited

U.S. PATENT DOCUMENTS

| 7,864,282 B2 | 1/2011 | Shimura et al. |
| 8,077,282 B2 | 12/2011 | Shimura et al. |
| 2007/0070282 A1* | 3/2007 | Shibahara ......... G02F 1/134363 349/141 |
| 2007/0242205 A1* | 10/2007 | Shimura ........... G02F 1/134363 349/141 |
| 2009/0180069 A1 | 7/2009 | Nishimura |
| 2013/0057816 A1* | 3/2013 | Hirosawa .............. G02F 1/1337 349/123 |

FOREIGN PATENT DOCUMENTS

| JP | 2007-286115 | 11/2007 |
| JP | 2008-052161 | 3/2008 |
| JP | 2009-168878 | 7/2009 |

OTHER PUBLICATIONS

Japanese Office Action issued Aug. 2, 2016 in corresponding Japanese Application No. 2013-218108.

* cited by examiner

*Primary Examiner* — Charles Chang
(74) *Attorney, Agent, or Firm* — K&L Gates LLP

(57) ABSTRACT

The present display device includes a liquid crystal panel having a liquid crystal layer between an array substrate and a facing substrate. The array substrate has an electrode layer having an upper electrode and a lower electrode facing each other in a Z direction, and an opening including a plurality of slits extending in an X direction is formed in the upper electrode and the lower electrode. The liquid crystal layer is provided on the electrode layer, liquid crystal molecules in vicinity regions on one side and the other side of the opening which face each other in a width direction of each slit are oriented as rotating in reverse to each other, and the facing substrate has a conductive layer.

14 Claims, 25 Drawing Sheets

FIG. 8

| | STRUCTURE A | STRUCTURE B |
|---|---|---|
| 31: UPPER ELECTRODE | 31A(PIX) ※PIX: PIXEL ELECTRODE<br>Rub → | 31B(COM)<br>Rub → |
| 32: LOWER ELECTRODE | 32A(COM) ※COM: COMMON ELECTRODE | 32B(PIX) |
| SHAPES OF ELECTRODE AND SLIT | STRUCTURE α:<br>BOTH-SIDE COMB TEETH SHAPE<br>(OR STRUCTURE β) | STRUCTURE β:<br>ONE-SIDE COMB TEETH SHAPE<br>(OR STRUCTURE α) |

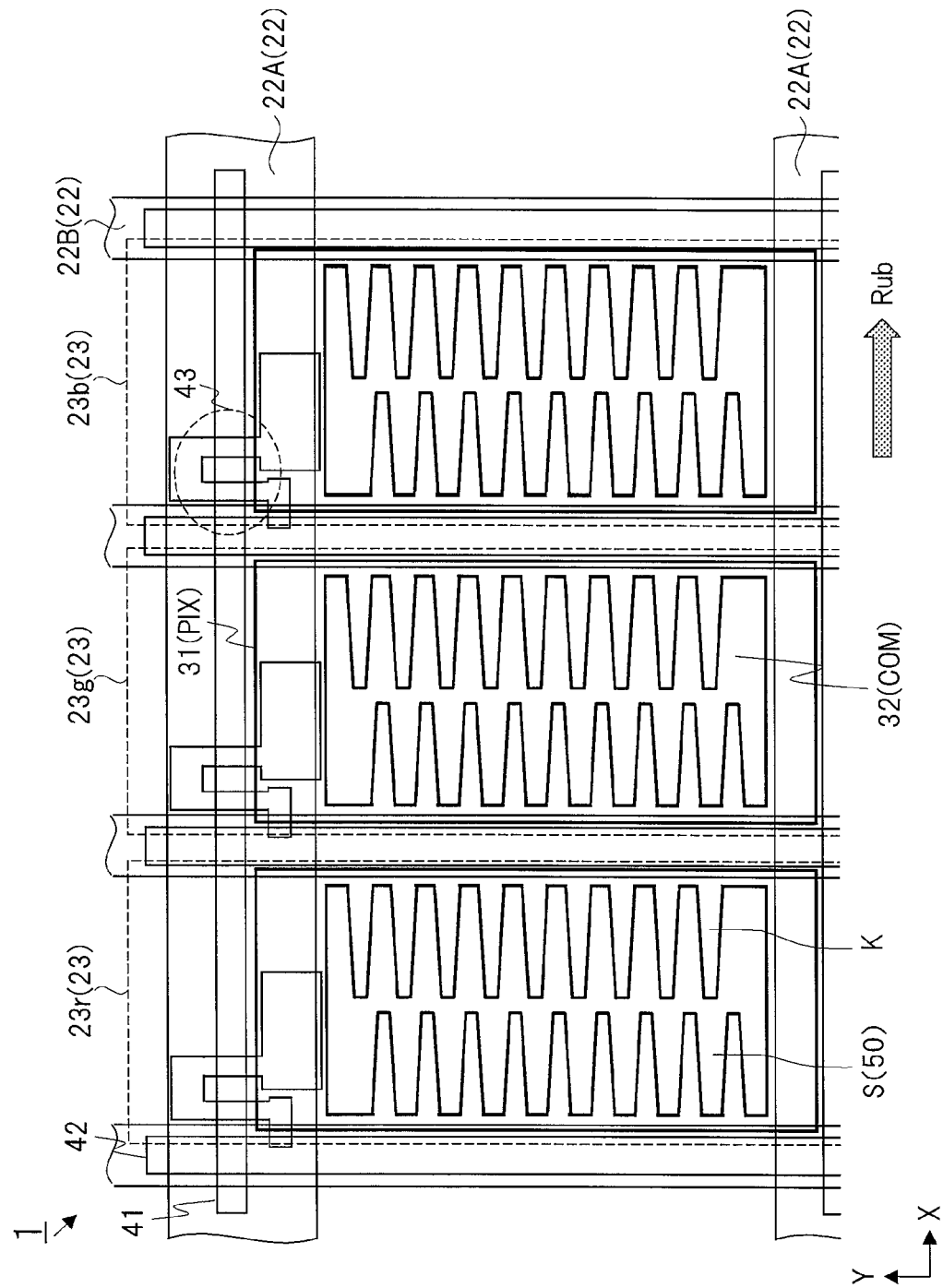

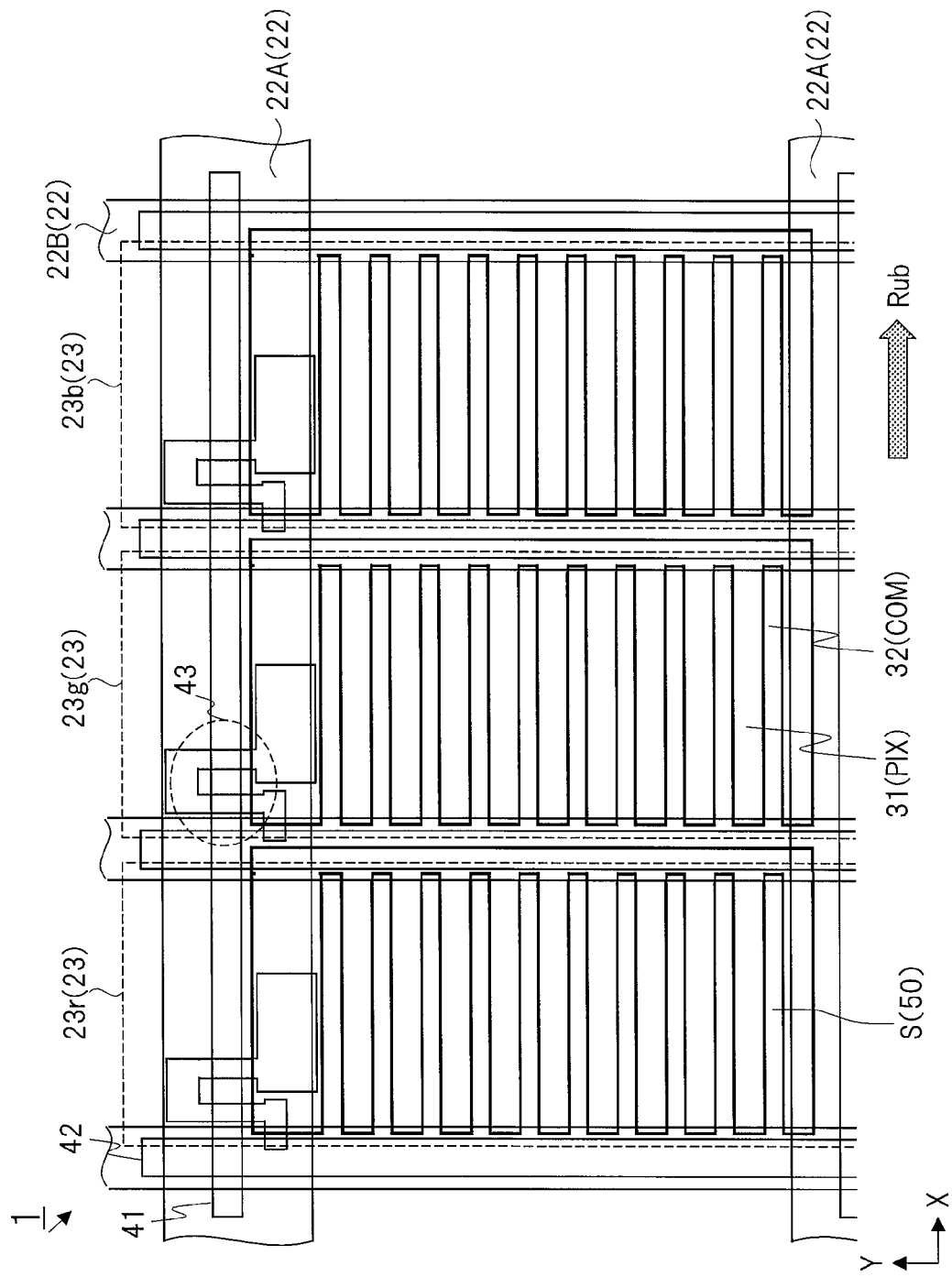

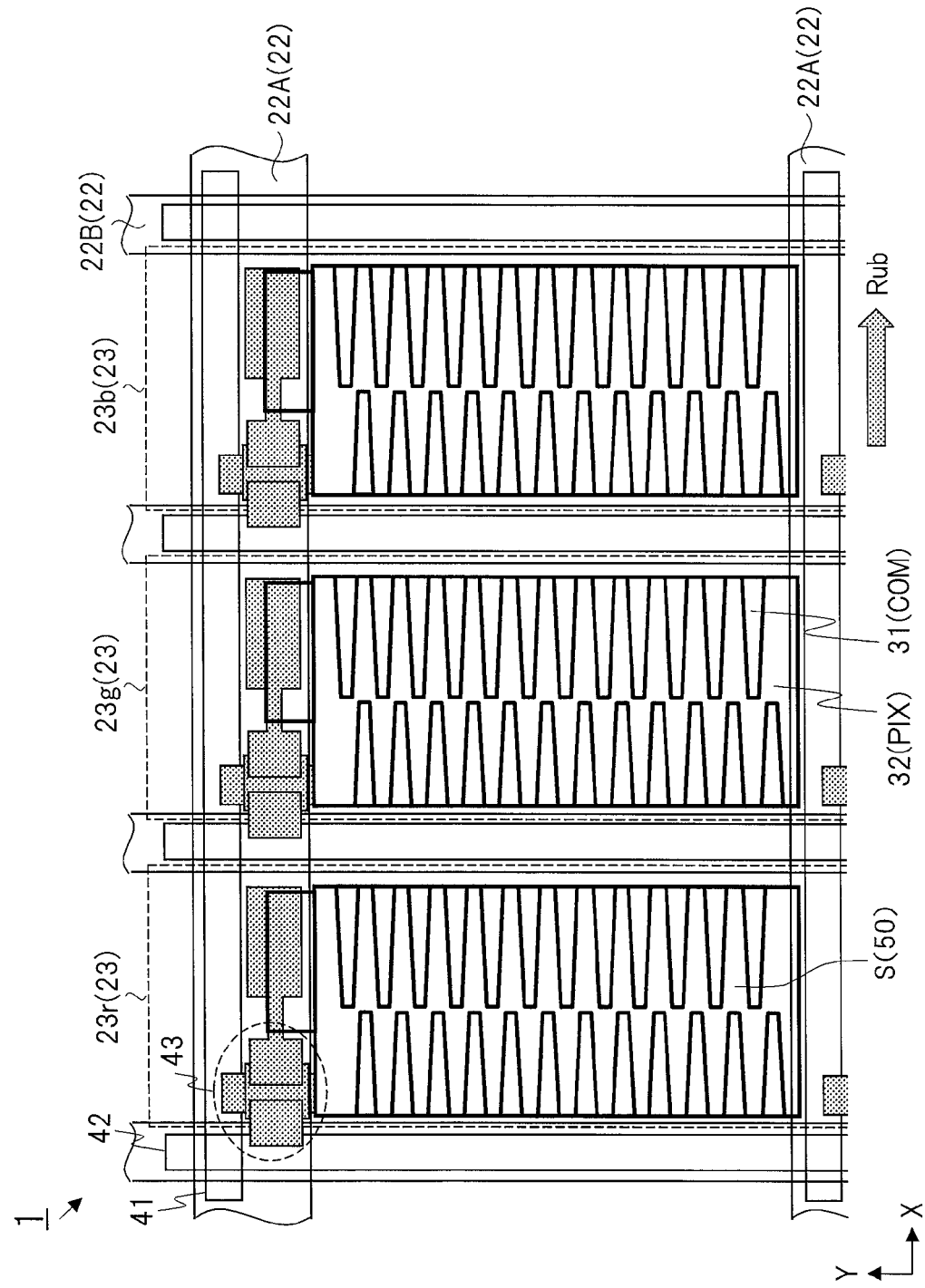

FIG. 14
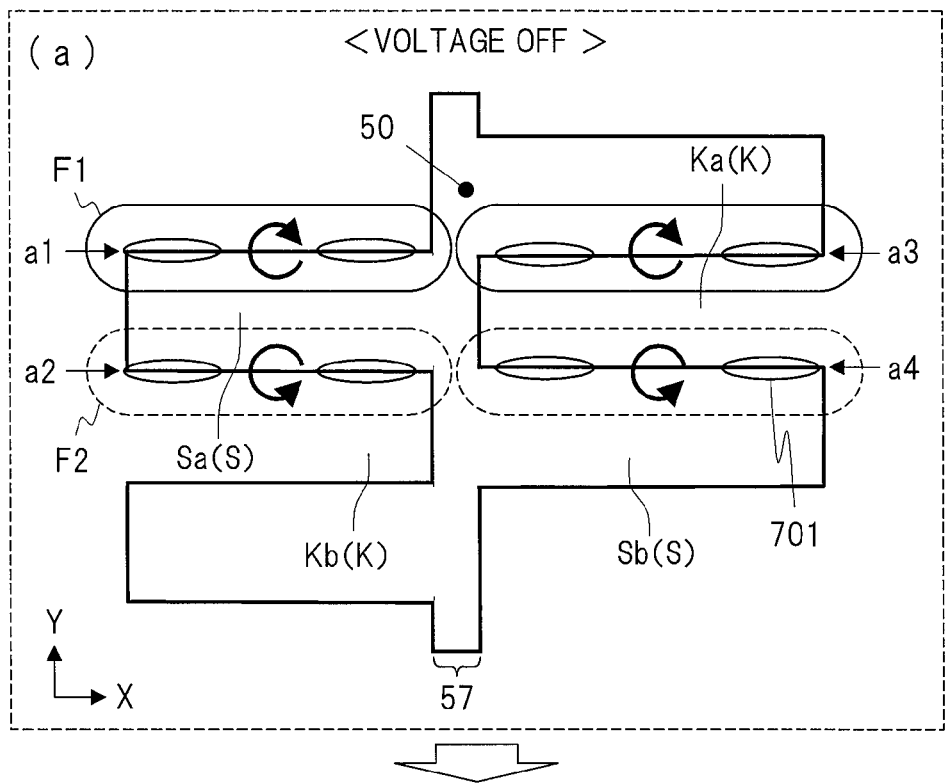
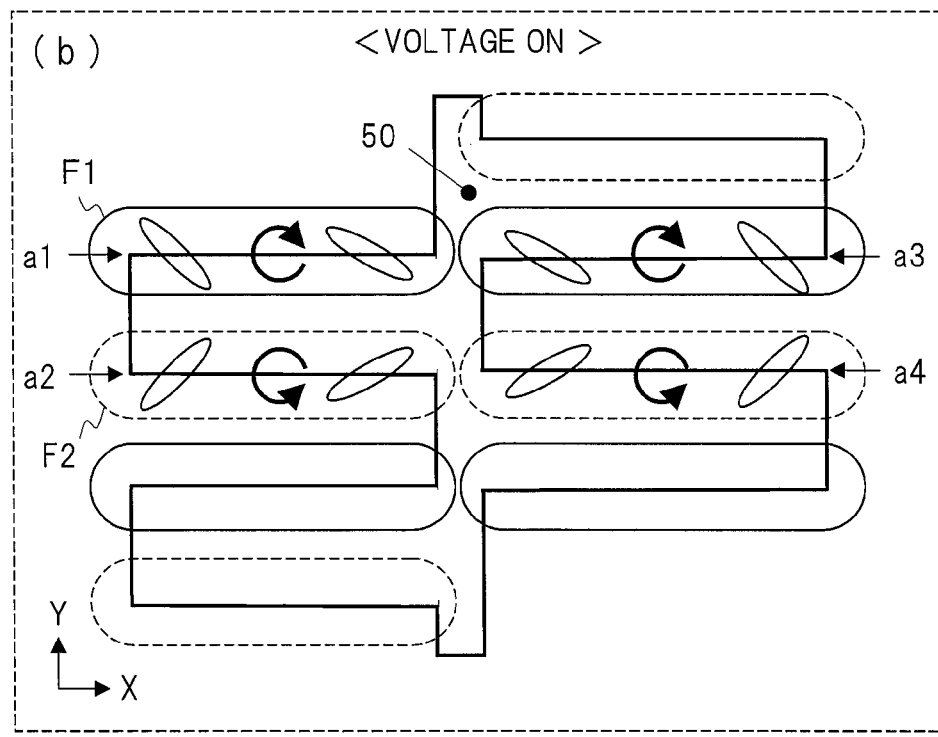

DISPLAY DEVICE AND ELECTRONIC APPARATUS

CROSS REFERENCES TO RELATED APPLICATIONS

The present application claims priority to Japanese Priority Patent Application JP 2012-236500 filed in the Japan Patent Office on Oct. 26, 2012, the entire content of which is hereby incorporated by reference.

BACKGROUND

The present invention relates to a technique for a display device and an electronic apparatus. More particularly, the present invention relates to a liquid crystal display device of a transverse electric field mode or others.

In liquid crystal display devices mounted on various electronic apparatuses or other, a transverse electric field mode and a longitudinal electric field mode are used as a mode for applying an electric field to a liquid crystal layer. Also, as the transverse electric field mode, IPS (In-Plane-Switching) mode, FFS (Fringe Field Switching) mode, or others is known. This transverse electric field mode is advantageous in a wider viewing angle and a higher aperture ratio than those of the longitudinal electric field mode. In the present specification, note that the aperture ratio is assumed to be an area ratio of an effective region for display in one pixel region.

Japanese Patent Application Laid-Open Publication No. 2008-52161 (Patent Document 1) discloses a technique regarding a liquid crystal display device of the FFS mode. The Patent Document 1 describes a technique for the liquid crystal display device of the FFS mode capable of increasing the aperture ratio without complicating a structure of the liquid crystal display device so as to achieve bright display.

SUMMARY

However, the liquid crystal display device of the transverse electric field mode such as the FFS mode described above has such a problem as a low response speed. The response speed described here is a speed at which, when a voltage is applied between an upper electrode and a lower electrode included in a certain pixel, a transmittance of liquid crystal in the pixel transits from a certain value to a different value. Specifically, the response speed is defined by time required for transition from, for example, an OFF state with transmittance of 0 to, for example, an ON state with transmittance of 1, or by time required for reverse transition of that.

In consideration of the above-described points, a main preferred aim of the present invention is to provide a display device or others capable of increasing the response speed so as to improve display quality and others more than that of a liquid crystal display device of a conventional transverse electric field mode such as the FFS mode or others in addition to widening the viewing angle and increasing the aperture ratio. More particularly, a main preferred aim of the present invention is to provide a display device or others capable of enhancing orientation stability of liquid crystal of a liquid crystal layer so as to improve the transmittance.

A typical aspect of the present inventions is a display device and an electronic apparatus with a feature having the following structure.

(1) A display device of the aspect includes: an electrode layer being provided on a first substrate and including a first electrode and a second electrode, the second electrode facing the first electrode and having an opening including a plurality of slits whose extending directions are the same as each other; a liquid crystal layer being provided between the first substrate and a second substrate facing the first substrate and having liquid crystal molecules oriented as rotating in reverse to each other in vicinity regions on one side and the other side of the opening which face each other in a width direction; and a conductive layer being provided on the second substrate.

Also, when orientation of liquid crystal of the liquid crystal layer is controlled, the conductive layer has the same potential as a potential of the first electrode or the second electrode.

(2) More particularly, the display device further includes: a first orientation film being provided between the first substrate and the liquid crystal layer and being subjected to an orientation process in a first orientation direction which is a substantially parallel direction or substantially orthogonal direction of the extending direction of the slits; and a second orientation film being provided between the second substrate and the liquid crystal layer and being subjected to an orientation process in a second orientation direction which is a parallel direction of the first orientation direction of the first orientation film. And, in an initial orientation state of the liquid crystal layer, long axes of the liquid crystal molecules are aligned in the first orientation direction. In the application of the voltage to the first electrode and the second electrode, the long axes of the liquid crystal molecules are oriented as rotating in an in-plane direction of the substrate so that the liquid crystal molecules rotate clockwise in a vicinity region including one side of both sides of an electrode forming the slits and the liquid crystal molecules rotate counterclockwise in a vicinity region including the other side thereof.

(3) More particularly, the second electrode is a pixel electrode, the first electrode is a common electrode, and the first electrode and the conductive layer have the same potential as each other when the orientation of the liquid crystal of the liquid crystal layer is controlled.

(4) More particularly, the second electrode is a common electrode, the first electrode is a pixel electrode, and the second electrode and the conductive layer have the same potential as each other when the orientation of the liquid crystal of the liquid crystal layer is controlled.

(5) For example, the conductive layer is a light-shielding film. Alternatively, the conductive layer is an electrostatic protective layer. Alternatively, the conductive layer is a transparent electrode.

(6) More particularly, in the display device, the second substrate has a transmission-side electrode and a reception-side electrode which are electrodes for configuring a touch sensor function as the conductive layer, and the first electrode or the second electrode and the transmission-side electrode or the reception-side electrode have the same potential as each other when the orientation of the liquid crystal of the liquid crystal layer is controlled.

(7) More particularly, in the display device, the second substrate has one electrode of a transmission-side electrode and a reception-side electrode which are electrodes for configuring a touch sensor function as the conductive layer, the first substrate has the other electrode of the transmission-side electrode and the reception-side electrode, and the first electrode or the second electrode and the one electrode of the transmission-side electrode and the reception-side electrode have the same potential as each other when the orientation of the liquid crystal of the liquid crystal layer is controlled.

(8) More particularly, the display device further includes a first driver connected to a first electrode line for configuring a pixel, a second driver connected to a second electrode line for configuring a pixel, a third driver connected to the second electrode and the first electrode, and a controller for controlling the first to third drivers.

(9) More particularly, the display device includes the first to third drivers, a fourth driver connected to the transmission-side electrode and the reception-side electrode, and a controller for controlling the first to fourth drivers.

(10) More particularly, the electronic apparatus includes a control unit for performing a display control process to the display device and a storage unit for storing display data to be provided to the display device.

According to a typical aspect of the present inventions, the response speed can be increased so as to improve display quality and others more than that of a liquid crystal display device of a conventional transverse electric field mode such as the FFS mode or others in addition to widening the viewing angle and increasing the aperture ratio. That is, according to the typical aspect of the present inventions, a liquid crystal display device of a high-speed transverse electric field mode or others can be provided. In other words, according to the typical aspect of the present inventions, the response speed in pixel display can be increased so as to improve brightness, that is, the transmittance or the orientation stability of the liquid crystal or others, so that display quality and others can be improved.

Additional features and advantages are described herein, and will be apparent from the following Detailed Description and the figures.

BRIEF DESCRIPTION OF THE FIGURES

FIG. 8 is a diagram collectively illustrating structure examples of an upper electrode and a lower electrode of the first embodiment or others;

FIG. 11A is a diagram illustrating a plan structure example of pixels in a case of the structure A and a structure α;

FIG. 11B is a diagram illustrating a plan structure example of pixels in a case of the structure A and a structure β;

FIG. 11C is a diagram illustrating a plan structure example of pixels in a case of the structure B and the structure α;

FIG. 14 is partially-enlarged diagrams of FIG. 13 for describing liquid crystal orientation or others, in which an item (a) illustrates a case of voltage OFF and an item (b) illustrates a case of voltage ON;

FIG. 15 is diagrams on a cross-sectional surface A1-A2 of FIG. 13 for describing the liquid crystal orientation or others, in which an item (a) illustrates the case of voltage OFF and an item (b) illustrates the case of voltage ON;

DETAILED DESCRIPTION

Figure 1:
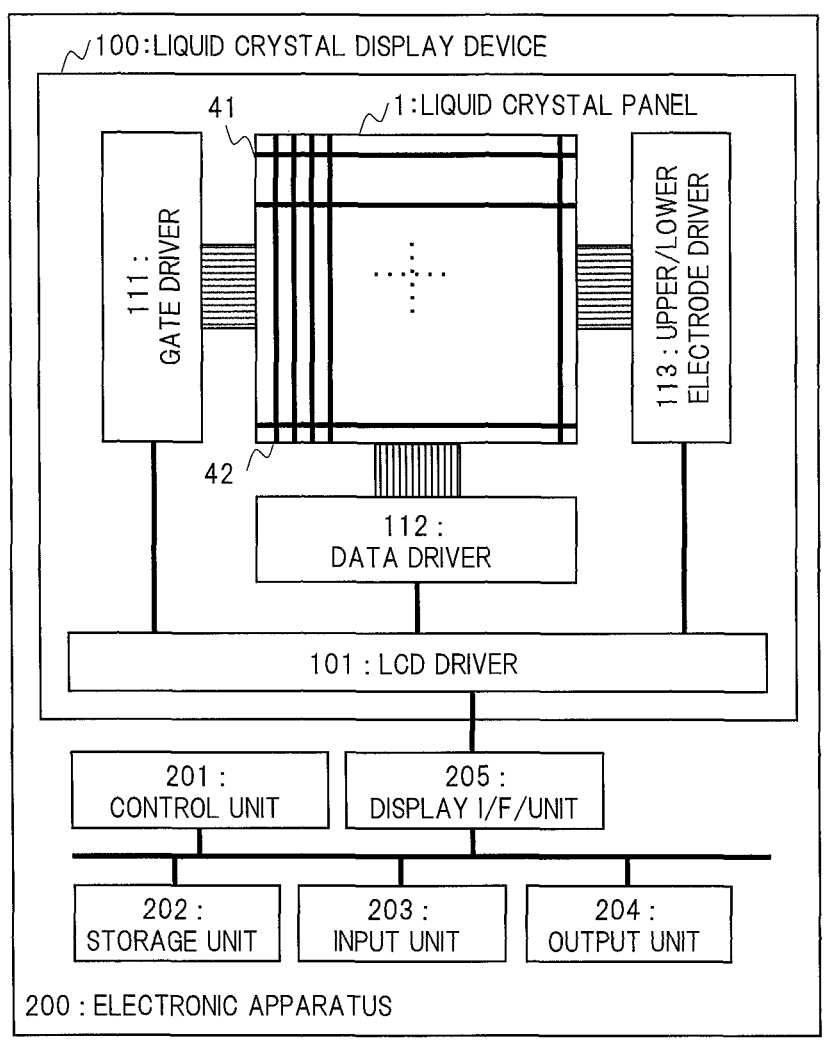
FIG. 1 is a diagram illustrating a block structure of a display device and an electronic apparatus of a first embodiment.

Hereinafter, embodiments of the present invention are described in detail based on the drawings. Note that in all drawings for describing the embodiments, the same portions are denoted by the same reference symbol in principle, and repetitive description thereof is omitted. Also, in the drawings, in order to easily understand features, cross-sectional hatching is appropriately omitted, and principal components are emphatically illustrated, and a dimensional ratio or others may differ from an actual ratio. For description, two directions orthogonal to each other in an in-plane direction of a substrate corresponding to a screen are assumed to be "X" and "Y" directions, and a direction perpendicular to the substrate surface, that is, a direction perpendicular to both of the X and Y directions, is assumed to be a "Z" direction.

<First Embodiment>

A first embodiment describes a case that a technique found by the present inventor of the present application is applied to a liquid crystal display device by which color moving images can be displayed on a screen and is applied to an electronic apparatus having the liquid crystal display device mounted thereon.

[Electronic Apparatus and Liquid Crystal Display Device]

FIG. 1 illustrates a block structure of a liquid crystal display device 100 which is a display device of the first embodiment, and an electronic apparatus 200 having the liquid crystal display device 100 mounted thereon. The electronic apparatus 200 includes: the liquid crystal display device 100; a control unit 201; a storage unit 202; an input unit 203; an output unit 204; a display interface unit 205; and others. A display I/F unit in FIG. 1 is the abbreviated expression of a display interface unit.

The control unit 201 is configured of, for example, a CPU (Central Processing Unit), a ROM (Read Only Memory), a RAM (Random Access Memory), programs that operate thereon, and others. For example, the CPU performs a control process on the electronic apparatus 200 such as a display control process with a computation process in accordance with a program loaded from the ROM to the RAM. The storage unit 202 is configured of a primary memory, a secondary memory, and data information such as video data stored therein. In other words, the storage unit 202 stores display data to be provided to the liquid crystal display device 100. The input unit 203 is configured of an input device such as a button and its interface processing unit. The output unit 204 is configured of an output device except for a display device and its interface processing unit. The display interface unit 205 is connected to the liquid crystal display device 100, and performs its interface process. The electronic apparatus 200 has other components not illustrated, such as a communication interface unit and a power supply unit.

The liquid crystal display device 100 has a liquid crystal panel 1 and an LCD (Liquid Crystal Display) driver 101 serving as a controller for main drive control. Also, the liquid crystal display device 100 also has a gate driver 111, a data driver 112, and an upper/lower-electrode driver 113 serving as drivers which are drive circuits for each electrode line of the liquid crystal panel 1. Each driver of the gate driver 111, the data driver 112, and the upper/lower-electrode driver 113 is achieved by, for example, mounting with a flexible printed circuit board connected to the liquid crystal panel 1 and equipped with an IC chip thereon, that is, by COP (Chip On Film), or by mounting with a circuit formed on a glass substrate in a frame part of the liquid crystal panel 1, that is, by COG (Chip On Glass). Note that the drivers may be appropriately integrated with or separated from each other. While the liquid crystal panel 1 and each driver are separated from each other in the drawing, the driver may be mounted in the liquid crystal panel 1.

To the control unit 201 of the electronic apparatus 200, for example, a video signal is inputted from outside of the control unit 201. Alternatively, inside the control unit 201, a video signal is generated. The video signal and a control signal serving as control instruction information are provided from the control unit 201 via the display interface unit 205 to the LCD driver 101. The LCD driver 101 provides the video signal and a control signal such as a timing signal to each driver of the gate driver 111, the data driver 112, and the upper/lower-electrode driver 113 for controlling them. The gate driver 111 follows the control of the LCD driver 101 to provide a scanning signal to a group of gate lines 41 of the liquid crystal panel 1. The data driver 112 follows the control of the LCD driver 101 to provide a data signal in accordance with a pixel value to the group of the data lines 42 of the liquid crystal panel 1. The upper/lower-electrode driver 113 follows the control of the LCD driver 101 to provide corresponding voltage signals to an upper electrode 31 and a lower electrode 32 (see FIG. 2 described later) of the liquid crystal panel 1, that is, a pixel voltage to a pixel electrode PIX (see FIG. 2 described later) and a common voltage to a common electrode COM (see FIG. 2 described later). In this manner, a transmittance per pixel is controlled.

As examples of the electronic apparatus 200, various electronic apparatuses are cited, such as a television device, that is, a liquid crystal television device, a personal-computer display, a digital camera, a video camera recorder (camcorder), a laptop personal computer, a mobile phone such as a smartphone, a mobile terminal such as a tablet computer, a display for a car navigation system, and others. When the electronic apparatus 200 is, for example, the liquid crystal television device or the personal-computer display, a filter glass or others is added to a front surface of the liquid crystal display device 100, and the liquid crystal display device 100, the filter glass, and others are held by a casing. When the electronic apparatus 200 is, for example, the digital camera or the video camera recorder, a display unit such as a camera finder is configured of the liquid crystal display device 100. When the electronic apparatus 200 is, for example, the laptop personal computer, a screen unit is configured of the liquid crystal display device 100. When the electronic apparatus 200 is, for example, the mobile phone, a screen unit is configured of the liquid crystal display device 100.

[Liquid Crystal Panel of First Embodiment]

Figure 2:
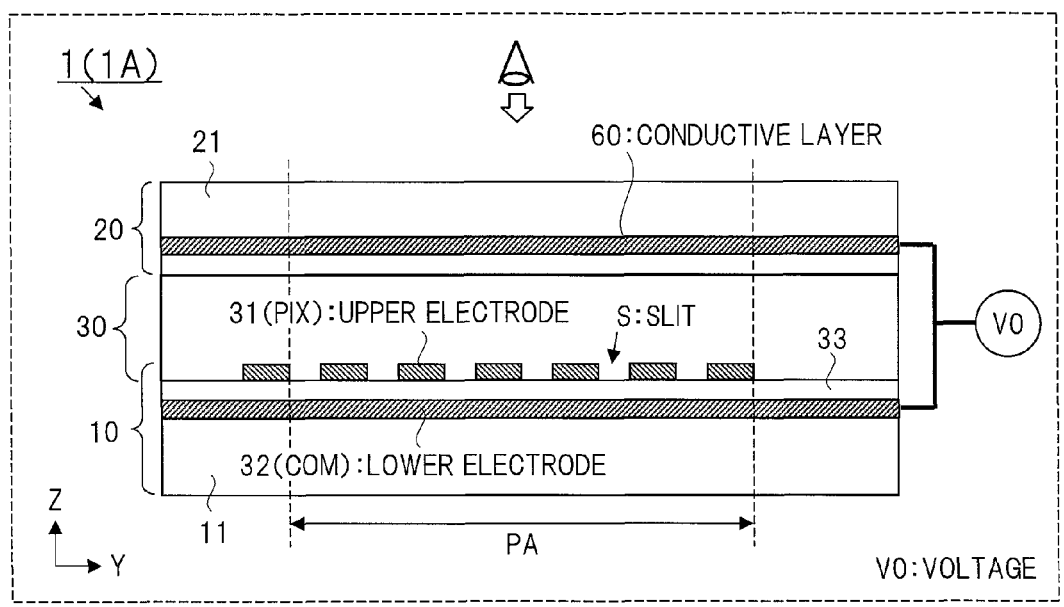
FIG. 2 is a diagram illustrating a schematic structure of a cross-sectional surface of a liquid crystal panel of the display device of the first embodiment.

FIG. 2 illustrates a schematic structure on a Y-Z cross-sectional surface of the liquid crystal panel 1 of the display device of the first embodiment. Note that the liquid crystal panel 1 of the first embodiment is particularly referred to as a liquid crystal panel 1A. In the liquid crystal panel 1A of the first embodiment, the lower electrode 32 serving as the common electrode COM on the glass substrate 11 on an array substrate 10 side and a conductive layer 60 on the glass substrate 21 on a facing substrate 20 side have the same potential as each other. That is, in the image displaying, that is, in the control of the liquid crystal orientation of the pixel in the liquid crystal panel 1A of the first embodiment, the same voltage V0 is applied from a not-illustrated driver side connected to the liquid crystal panel 1A to the lower electrode 32 and the conductive layer 60 which are two types of layers arranged at different positions from each other in the Z direction. In other words, a potential of the conductive layer 60 is equal to a potential of the lower electrode 32 in the control of the liquid crystal orientation of the liquid crystal layer. In this manner, in viewing from the Z direction, that is, in an X-Y planar view, such an effect that the orientation stability of the liquid crystal is increased can be obtained in regions including a vicinity of the conductive layer 60 (see FIG. 21 described later). In other words, in the X-Y planar view, such an effect that the orientation of the liquid crystal is stabilized can be obtained in the region where the conductive layer 60 is formed and the region in the vicinity of the conductive layer 60. That is, in the image displaying, such an effect that responsiveness is favorable so as to increase the display quality can be obtained.

In the first embodiment, the upper electrode 31 is the pixel electrode PIX, and the lower electrode 32 is the common electrode COM (see a structure A of FIG. 8 described later). Also, a shape of an opening 50 can be various any shapes, and the shape of the opening 50 can be, for example, an alternate both-side comb teeth shape (see a structure α of FIG. 8 described later). The position of the conductive layer 60 in the Z direction and the X-Y planar shape can be any, and can be a position and a shape in accordance with the function of the conductive layer 60.

The display device includes the liquid crystal panel 1A, and the liquid crystal panel 1A has an array substrate 10 serving as a first substrate, a facing substrate 20 serving as a second substrate, and a liquid crystal layer 30 interposed and sealed therebetween. Note that FIG. 2 illustrates a schematic structure, and illustrations of an insulating film, an orientation film, a polarizing plate, a backlight, and other publicly-known components are omitted. A reference symbol "PA" represents a display area. A reference symbol "V0" represents a voltage applied to the lower electrode 32 and the conductive layer 60 arranged at different positions from each other in the Z direction.

The array substrate 10 is a substrate structure body including a structure on a back surface side with respect to a line of sight and the glass substrate 11. In other words, the array substrate 10 is a substrate structure body including the glass substrate 11 and having a structure on the back surface side. The lower electrode 32, a dielectric film 33, and the upper electrode 31 are stacked on one side with respect to the glass substrate 11 in the Z direction, that is, on the glass substrate 11. While a gate line, a TFT unit, and others are provided on the glass substrate 11, they will be described in detail later. The upper electrode 31 and the lower electrode 32 are formed to be layered so as to face in parallel to each other via the dielectric film 33. An electrode layer including the upper electrode 31 and the lower electrode 32 has a portion where the upper electrode 31 and the lower electrode 32 overlap each other when viewed in the Z direction and a portion where the upper electrode 31 and the lower electrode 32 do not overlap each other when viewed in the Z direction. By this shape in the X-Y planar view, the opening 50 including a slit S (see FIG. 8 described later) is formed. On the electrode layer including the upper electrode 31 and the lower electrode 32 with the opening 50 formed thereon, a fringe electric field occurs for controlling the liquid crystal orientation of the liquid crystal layer 30 in X and Y directions which are in-plane directions of the substrate. In other words, the fringe electric field occurs for controlling the liquid crystal orientation of the liquid crystal layer 30 in vicinity of the opening 50. Therefore, the liquid crystal panel 1A is the liquid crystal display device of the transverse electric field mode.

In the first embodiment, in the upper electrode 31 and the lower electrode 32, the upper electrode 31 is the pixel electrode PIX, and the lower electrode 32 is the common electrode COM. On the electrode layer including the upper electrode 31 and the lower electrode 32, the opening 50 having the slit S extending in a transverse direction, that is, in the X direction, corresponding to the high-speed transverse electric field mode is formed as illustrated in FIG. 11A described later or others. A structure example of the upper electrode 31 and the lower electrode 32 can be various structure examples summarized in FIG. 8 described later.

The facing substrate 20 is a substrate structure body including a structure on a front surface side and the glass substrate 21. In other words, the facing substrate 20 is a substrate structure body including the glass substrate 21 and having a structure on the front surface side with respect to the line of sight. In the facing substrate 20, the conductive layer 60 is provided at any position in the Z direction such as an inner surface side or an outer surface side on the glass substrate 21. Note that the inner surface side indicates one of both sides of the glass substrate 21 in the Z direction which is close to the liquid crystal layer 30, and the outer surface side indicates the other of both sides of the glass substrate 21 in the Z direction which is away from the liquid crystal layer 30. FIG. 2 illustrates a case in which the conductive layer 60 is provided on the inner surface side. The conductive layer 60 is a layer of a conductive electrode or others. A position of the conductive layer 60 in the facing substrate 20 in the Z direction is not particularly limited. Also, a distance between the lower electrode 32 and the conductive layer 60 in the Z direction is not particularly limited, either. Further, the shape and the position of the conductive layer 60 in the facing substrate 20 in the X and Y directions are not particularly limited.

The lower electrode 32 serving as the common electrode COM is formed as a solid layer over a region including a plurality of pixels such as the entire screen. Also, the lower electrode 32 is controlled by application of a common voltage thereto so as to have the same potential regardless of the pixel. Note that the lower electrode 32 may not be formed as the solid layer over the entire screen, and a plurality of lower electrodes 32 may be formed so as to be arranged for the plurality of respective pixels. In such a case that the plurality of lower electrodes 32 are formed, the plurality of lower electrodes 32 are connected to each other via a common electrode line. The upper electrode 31 serving as the pixel electrode PIX is formed for each pixel. A shape of the upper electrode 31 is a rectangular shape. Also, the upper electrode 31 is controlled so as to have a different potential for each pixel. The upper electrode 31 and the lower electrode 32 are transparent electrodes each made of a material having conductivity and transmission property with respect to visible light, such as ITO (Indium-Tin-Oxide).

The liquid crystal of the liquid crystal layer 30 is sealed between the array substrate 10 and the facing substrate 20 via first and second orientation films serving as orientation films. The array substrate 10 and the facing substrate 20 are connected to each other by a sealing material in the frame part of the liquid crystal panel 1 or others, so that the liquid crystal is sealed between the array substrate 10 and the facing substrate 20. The first orientation film is provided between the liquid crystal layer 30 and the electrode layer including the upper electrode 31 and the lower electrode 32 on the array substrate 10 side, and the second orientation film is provided between the liquid crystal layer 30 and the facing substrate 20. An orientation process for the liquid crystal by antiparallel orientation which supports the structure of the opening including the slit S, more particularly, a rubbing process is performed for the first and second orientation films, so that an orientation state of the liquid crystal of the liquid crystal layer 30 obtained when no potential difference is provided between the upper electrode 31 and the lower electrode 32, that is, an initial orientation state thereof becomes a predetermined orientation state, and the high-speed transverse electric field mode which is the present method of driving the liquid crystal is achieved.

In the image displaying, a predetermined potential difference in accordance with modulation of the pixel transmittance is provided between the upper electrode 31 and the lower electrode 32 via the dielectric film 33 by applying a voltage from the driver side to the upper electrode 31 and the lower electrode 32. By the potential difference, the fringe electric field is caused in the vicinity of the opening 50. By the caused fringe electric field, the liquid crystal orientation is controlled so that the liquid crystal molecules rotate mainly in the X and Y directions which are the in-plane directions of the substrate. In other words, by the fringe electric field, the liquid crystal orientation is controlled so that the liquid crystal molecules rotate in a substrate plane.

A lower polarizing plate and an upper polarizing plate are arranged on a back surface side of the array substrate 10, that is, a lower side thereof, and on a front surface side of the facing substrate 20, that is, an upper side thereof, respectively, so that a polarization state of transmitted light is controlled by the lower polarizing plate and the upper polarizing plate. A transmission axis of the upper polarizing plate and a transmission axis of the lower polarizing plate are orthogonal to each other, and one of the transmission axes of the lower polarizing plate and the upper polarizing plate is in parallel to a direction of the liquid crystal orientation. The backlight or others is arranged on the back surface side of the array substrate 10, and an illumination state of the backlight or others is controlled by a not-illustrated driver for backlight control in accordance with the control of the state of the liquid crystal orientation. The transmission and polarization are controlled in the liquid crystal panel 1 in accordance with the pixel state based on light emitted from the backlight, so that an image is formed on the screen on the front surface side. In other words, the transmittance of the light emitted from the backlight and the polarization state of transmitted light are controlled in each pixel, so that the image is displayed on the screen.

As described above, the same potential is provided for the lower electrode 32 and the conductive layer 60 arranged at different positions from each other in the Z direction, so that the state of the liquid crystal orientation in a space between these layers can be stabilized. In the first embodiment, the lower electrode 32 is used as the common electrode COM, the lower electrode 32 and the conductive layer 60 are controlled so as to have the same potential. In this manner, the effect of the orientation stability of the liquid crystal can be higher than, for example, that of a later-described first modification example of the first embodiment in which the upper electrode 31 is used as the common electrode COM.

When the lower electrode 32 and the conductive layer 60 are controlled so as to have the same potential, note that the same potential is not necessarily maintained for the entire period of time. By maintaining the same potential for a certain period of time or longer with respect to the entire period of time, a proper effect can be obtained. Also, when the lower electrode 32 and the conductive layer 60 are controlled so as to have the same potential, exactly the same potential such as the voltage V0 is not necessarily maintained. By maintaining the potential in a range of a close potential to some extent, a proper effect can be obtained.

[Liquid Crystal Panel of First Modification Example of First Embodiment]

Figure 3:
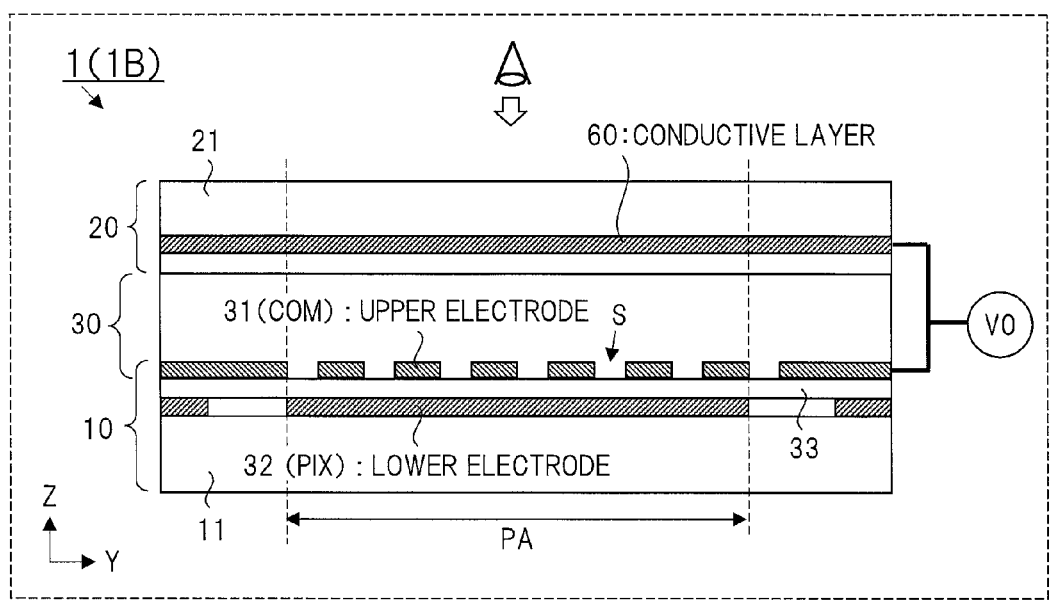
FIG. 3 is a diagram illustrating a schematic structure of a cross-sectional surface of a liquid crystal panel of a display device of a first modification example of the first embodiment.

FIG. 3 illustrates a schematic structure of a Y-Z cross-sectional surface of the liquid crystal panel 1 of the display device of the first modification example of the first embodiment. Note that the liquid crystal panel 1 of the first modification example of the first embodiment is particularly referred to as a liquid crystal panel 1B. In the liquid crystal panel 1B of the first modification example of the first embodiment, the upper electrode 31 serving as the common electrode COM on the glass substrate 11 on the array substrate 10 side and the conductive layer 60 on the glass substrate 21 on the facing substrate 20 side have the same potential. In the first modification example of the first embodiment, the upper electrode 31 is the common electrode COM, and the lower electrode 32 is the pixel electrode PIX (see a structure B of FIG. 8 described later). Also, a shape of an opening 50 can be various any shapes, and can be, for example, a one-side comb teeth shape (see a structure β of FIG. 8 described later).

Also in the first modification example of the first embodiment, the effect that the orientation stability of the liquid crystal is increased as similar to the first embodiment can be obtained in regions including vicinity of the conductive layer 60 in the X-Y planar view. In other words, in the X-Y planar view, the effect that the orientation of the liquid crystal is stabilized can be obtained in the region where the conductive layer 60 is formed and the region in the vicinity of the conductive layer 60. In comparison between the first embodiment and the first modification example of the first embodiment, note that the effect of the orientation stability is higher in the first embodiment as described above when two layers are controlled so as to have the same potential as each other.

As similar to the first embodiment, note that an aspect in which the lower electrode 32 is the common electrode COM and one of the two types of layers having the same potential is the lower electrode 32 will be described below. However, as similar to the first modification example of the first embodiment, an aspect in which the upper electrode 31 is the common electrode COM and one of the two types of layers having the same potential is the upper electrode 31 is also possible.

[Liquid Crystal Panel of Second Modification Example of First Embodiment]

Figure 4:
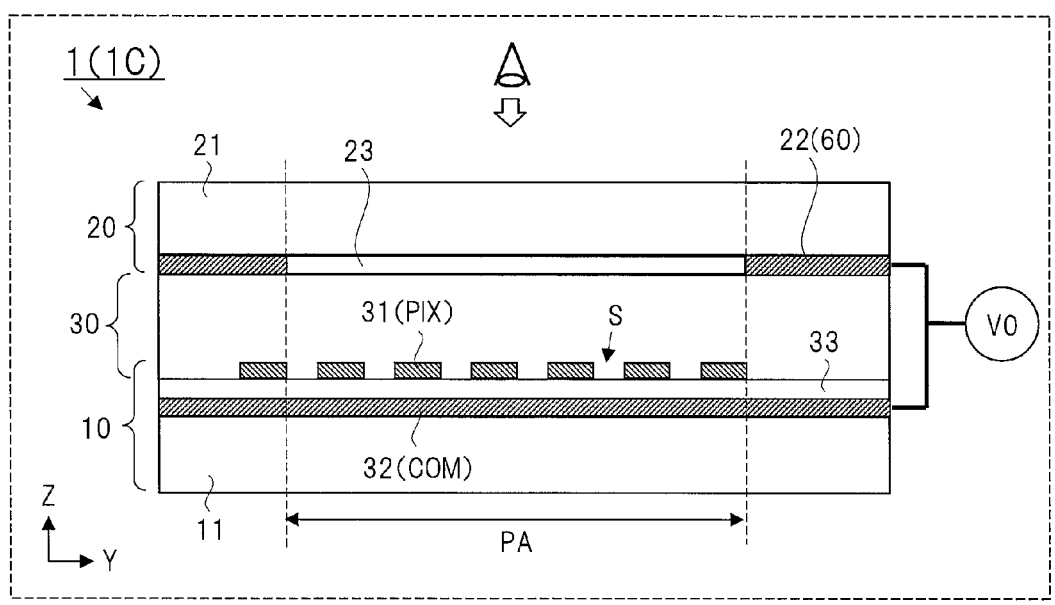
FIG. 4 is a diagram illustrating a schematic structure of a cross-sectional surface of a liquid crystal panel of a display device of a second modification example of the first embodiment.

FIG. 4 illustrates a schematic structure of a Y-Z cross-sectional surface of the liquid crystal panel 1 of the display device of the second modification example of the first embodiment. Note that the liquid crystal panel 1 of the second modification example of the first embodiment is particularly referred to as a liquid crystal panel 1C. In the liquid crystal panel 1C of the second modification example of the first embodiment, the conductive layer 60 in the liquid crystal panel 1A of the first embodiment is a light-shielding film 22. And, in the liquid crystal panel 1C of the second modification example of the first embodiment, the lower electrode 32 serving as the common electrode COM on the array substrate 10 and the light-shielding film 22 on the facing substrate 20 side have the same potential.

In the facing substrate 20, layers of the light-shielding film 22 and a color filter 23 are provided. While a position of the light-shielding film 22 in the facing substrate 20 in the Z direction is any position, the light-shielding film 22 is formed on an inner surface side on the glass substrate 21 in the structure example of FIG. 4. The color filter 23 is arranged in accordance with pixel arrangement (see FIG. 11A described later).

The light-shielding film 22 is made of a material having light shielding property, that is, a light absorption property or low light transmittance property, such as a metal of Cr or others or a low-resistant resin containing carbon. Note that the light-shielding film is also referred to as a black film. A main role of the light-shielding film 22 is light shielding for reducing crosstalk between the pixels. When the light-shielding film 22 is made of the above-described material such as Cr, the light-shielding film becomes a layer having conductivity, and corresponds to the conductive layer 60. The light-shielding film 22 is formed in, for example, a lattice shape which sections the pixels in accordance with the pixel arrangement (see FIG. 11A described later).

In the facing substrate 20, the layers such as the light-shielding film 22 and the color filter 23 are formed on the glass substrate 21. Here, the term "on the glass substrate 21" means a lower side as one side of the glass substrate 21 in the Z direction, which is a side close to the liquid crystal layer 30. The facing substrate 20 is also referred to as a CF substrate. Note that the light-shielding film 22 and the color filter 23 are arranged in the same layer as each other in the example illustrated in FIG. 4. However, they may be arranged in different layers from each other. Also, an overcoat layer or others having a function as a planarizing layer and a protective layer not illustrated may be provided on the inner surface side which is the side close to the liquid crystal layer 30 on the light-shielding film 22 and the color filter 23. Further, an electrostatic protective layer or others in addition to the polarizing plate may be provided on the front surface side of the facing substrate 20.

According to the second modification example of the first embodiment, the effects or others as similar to the first embodiment are obtained, in which the orientation of the liquid crystal in the space between the lower electrode 32 and the light-shielding film 22 is stabilized so that the transmittance is improved by the orientation stability of the liquid crystal in the region including the vicinity of the light-shielding film 22 in the X-Y planar view. In other words, the effects or others are obtained, in which the orientation of the liquid crystal is stabilized so that the transmittance is improved in the region where the light-shielding film 22 is formed and the region in the vicinity of the light-shielding film 22 in the X-Y planar view.

[Liquid Crystal Panel of Third Modification Example of First Embodiment]

Figure 5:
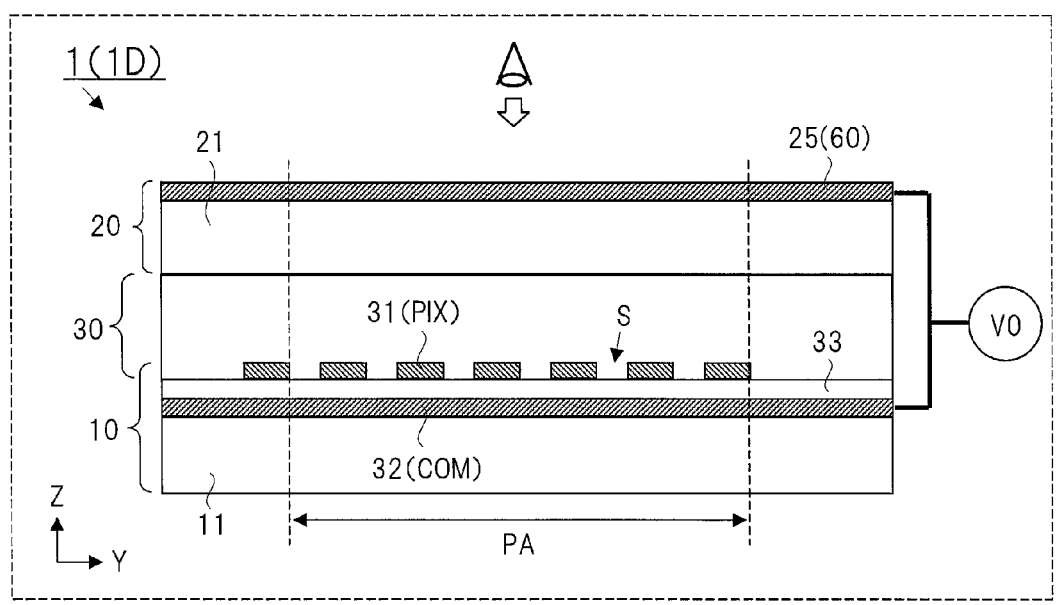
FIG. 5 is a diagram illustrating a schematic structure of a cross-sectional surface of a liquid crystal panel of a display device of a third modification example of the first embodiment.

FIG. 5 illustrates a schematic structure of a Y-Z cross-sectional surface of the liquid crystal panel 1 of the display device of the third modification example of the first embodiment. Note that the liquid crystal panel 1 of the third modification example of the first embodiment is particularly referred to as a liquid crystal panel 1D. In the liquid crystal panel 1D of the third modification example of the first embodiment, the conductive layer 60 in the liquid crystal panel 1A of the first embodiment is an electrostatic protective film 25. The electrostatic protective film 25 is also referred to as an electrostatic preventing film. And, in the liquid crystal panel 1D of the third modification example of the first embodiment, the lower electrode 32 serving as the common electrode COM on the array substrate 10 and the electrostatic protective film 25 on the facing substrate 20 side have the same potential as each other.

The electrostatic protective layer 25 is provided at any position on the facing substrate 20 in the Z direction. More particularly in the example illustrated in FIG. 5, the electrostatic protective layer 25 is provided at a position on the front surface side of the facing substrate 20, that is, on the outer surface side of the glass substrate 21. The electrostatic protective layer 25 is a layer having a function which prevents charging of static electricity on the screen of the liquid crystal panel, in other words, a function which discharges the charged static electricity to the outside of the liquid crystal panel, and corresponds to the conductive layer 60 described by using FIG. 2. Note that the example illustrated in FIG. 5 is an example in which a dedicated layer to the function of the electrostatic protection is provided, and is different from a later-described example in which a transmission-side electrode and a reception-side electrode are provided.

According to the third modification example of the first embodiment, the effects or others as similar to the first embodiment are obtained, in which the orientation of the liquid crystal in the space between the lower electrode 32 and the electrostatic protective layer 25 is stabilized so that the transmittance is improved by the orientation stability of the liquid crystal in the region including the vicinity of the electrostatic protective layer 25 in the X-Y planar view. In other words, the effects or others are obtained, in which the orientation of the liquid crystal is stabilized so that the transmittance is improved in the region where the electrostatic protective layer 25 is formed and the region in the vicinity of the electrostatic protective layer 25 in the X-Y planar view.

Note that the facing substrate 20 may be further provided with both of the layers such as the light-shielding film 22 and the color filter 23 of the second modification example of the first embodiment and the electrostatic protective layer 25 of the third modification example of the first embodiment. In this case, one of the light-shielding film 22 and the electrostatic protective layer 25 may be controlled so as to have the same potential as that of the other layer, or both of the light-shielding film 22 and the electrostatic protective layer 25 may be controlled so as to have the same potential as each other.

[Manufacturing Method]

A method of manufacturing the liquid crystal panel 1 includes, for example, the following processes. Note that the second modification example of the first embodiment, that is, the case of the structure A will be described below.

In a manufacturing process of the array substrate 10, layers of a gate line, a data line, a TFT part, and others are formed on one side of the glass substrate 11 in the Z direction, that is, on the glass substrate 11. Then, an insulating film having a function serving as a planarizing layer is formed thereon. The insulating film is made of a material such as polyimide or silicon oxide. On the insulating film, a layer of the lower electrode 32 serving as the common electrode COM made of ITO is formed as, for example, a solid layer over the entire surface of the insulating film. On the lower electrode 32 serving as the common electrode COM, the dielectric film 33 is formed as the solid layer over the entire surface. The dielectric film 33 is formed as a planarizing layer. The dielectric film 33 has insulating and protecting properties, is made of, for example, a material such as silicon nitride or silicon oxide, and is formed by a plasma CVD method or others. On a plane surface of the dielectric film 33, the layer of the upper electrode 31 serving as the pixel electrode PIX made of ITO is formed as a pattern layer having an opening by photo-etching (photolithography etching) or others. A thickness of the lower electrode 32 is, for example, 10 to 100 nm, a thickness of the upper electrode 31 is, for example, 50 to 150 nm, and a thickness of the dielectric film 33 is, for example, 10 to 100 nm. On the upper electrode 31 serving as the pixel electrode PIX, the first orientation film to which the orientation process is performed in a first rubbing direction is formed. The first orientation film is formed by performing the orientation process such as a rubbing process to a high polymer material such as polyimide. Note that the orientation process is not limited to the rubbing process, and orientation processes of other methods such as an optical orientation process is also applicable.

In the manufacturing process on the facing substrate 20 side, the layers of the color filter 23 and the light-shielding film 22 are formed on the glass substrate 21, and the overcoat layer or others having the functions serving as the planarizing layer and the protective layer is formed thereon. Here, the term "on the glass substrate 21" means a lower side as one side of the glass substrate 21 in the Z direction. The second orientation film to which the orientation process is performed in a second rubbing direction is formed thereon.

The liquid crystal layer 30 is formed by facing the array substrate 10 and the facing substrate 20 each other, injecting liquid crystal between the array substrate 10 and the facing substrate 20, and sealing the frame part with a sealer. A polarizing plate, a backlight, and others are mounted on the back surface side of the liquid crystal panel 1, and a polarizing plate and others are mounted on the front surface side of the liquid crystal panel 1. To an electric end of the frame part of the liquid crystal panel 1, for example, a wiring for each driver is connected. The liquid crystal panel 1 is manufactured as described above.

[Mount Structure Example (1)]

Figure 6:
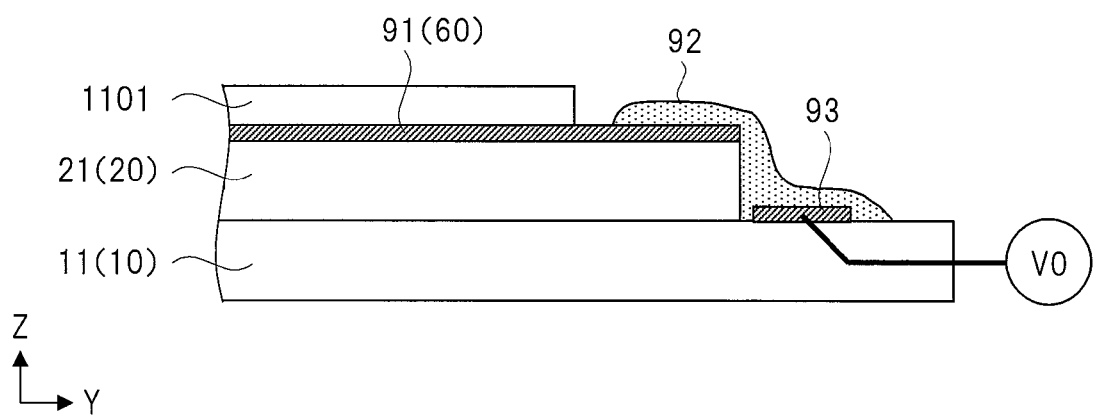
FIG. 6 is a diagram illustrating a first mounting structure example of the display device of the first embodiment.

FIG. 6 illustrates a first mount structure example of the display device of the first embodiment including the liquid crystal panel 1, its driver circuit, and others described above. The first mount structure example corresponds to a case in which the conductive layer 60 is provided on the outer surface side of the facing substrate 20 in the first embodiment and the first and third modification examples of the first embodiment. In the first mount structure example, one end of an ITO pad 93 serving as the lower electrode 32 on the glass substrate 11 on the array substrate 10 side and one end of an ITO 91 serving as the conductive layer 60 on the glass substrate 21 on the facing substrate 20 side are connected to each other by a conductive paste 92 serving as a conductive material in an end region of the liquid crystal panel 1 in the X or Y direction.

The ITO pad 93 is formed at the end of the glass substrate 11 on the back surface side having an area wider than that of the glass substrate 21 on the front surface side. The lower electrode 32 serving as the common electrode COM not illustrated is connected to the ITO pad 93. To the ITO pad 93, a driver not illustrated is connected. Also, as the conductive layer 60 on the facing substrate 20 side, the ITO 91 is formed on the outer surface side of the glass substrate 21. A reference symbol 1101 denoted on an upper side of the ITO 91 denotes a polarizing plate provided on the front surface side of the facing substrate 20. Illustration of other components such as the liquid crystal layer 30 is omitted. The conductive paste 92 is formed so as to be connected to one end of the ITO 91 being exposed and extending to an end region of the glass substrate 21 on the upper side and to one end of the ITO pad 93 being exposed and extending to an end region of the glass substrate 11 on the lower side. In this manner, the ITO 91 and the ITO pad 93 are conducted to each other.

According to the present mount structure, by, for example, applying the voltage V0 from the driver side to the ITO pad 93, the same voltage V0 can be applied from the ITO pad 93 to the lower electrode 32 and to the ITO 91 serving as the conductive layer 60. In other words, in a pixel writing period in the pixel display, for example, the voltage V0 can be applied from the upper/lower-electrode driver 113 (see FIG. 1) to the lower electrode 32, and the voltage V0 can be applied from the upper/lower-electrode driver 113 to the conductive layer 60.

[Mount Structure Example (2)]

Figure 7:
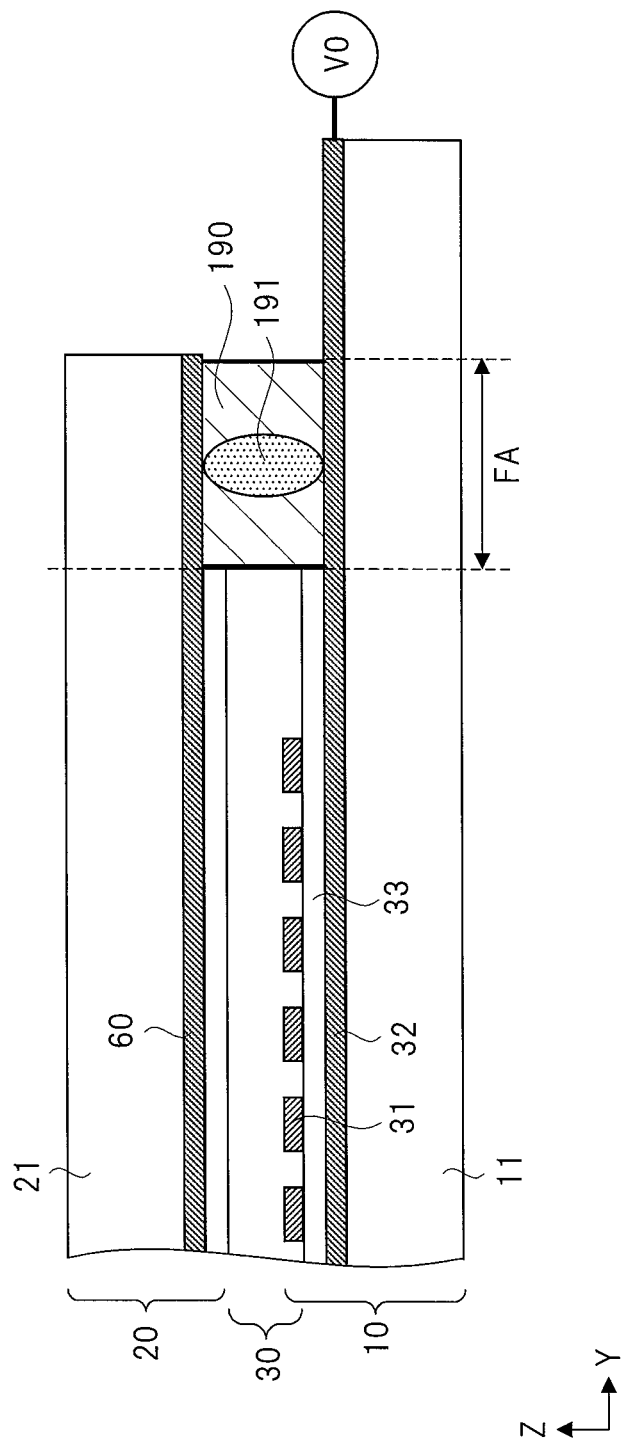
FIG. 7 is a diagram illustrating a second mounting structure example of the display device of the first embodiment.

FIG. 7 illustrates a second mount structure example of the display device of the first embodiment including the liquid crystal panel 1, its driver circuit, and others described above. The second mount structure example corresponds to a case in which the conductive layer 60 is provided on the inner surface side of the facing substrate 20 in the first embodiment and the first and second modification examples of the first embodiment. In the second mount structure example, one end of the lower electrode 32 and one end of the conductive layer 60 are electrically connected to each other by a conductive part 191 in a region FA serving as the frame part of the liquid crystal panel 1.

In the region FA serving as the frame part of the liquid crystal panel 1, a sealing part 190 that connects between the array substrate 10 and the facing substrate 20 and seals the liquid crystal layer 30 is provided. The sealing part 190 is made of a predetermined sealing material or others. Inside the sealing part 190 itself, a conducting part 191 that conducts one end of the lower electrode 32 on the array substrate 10 side and one end of the conductive layer 60 on the inner surface side on the facing substrate 20 side is provided. The conducting part 191 can be made of a conductive material such as ITO or existing conductive particles. A thickness of the liquid crystal layer 30 compared with those of the glass substrates 11 and 21 is practically small.

Note that the sealing part 190 and the conducting part 191 may be separated and provided at different positions from each other in the X or Y direction. For example, the conducting part 191 may be provided at an inner position than the sealing part 190 of the liquid crystal panel 1, that is, an inner position of the liquid crystal panel 1 in the X or Y direction. In other words, the conducting part 191 may be provided at a position closer to a center side of the liquid crystal panel 1 than the sealing part 190 in the planar view. The lower electrode 32 and the conductive layer 60 have the same potential by applying the voltage V0 from the driver side to, for example, one end of the lower electrode 32 of the lower electrode 32 and the conductive layer 60 which are two electrodes conducted to each other by the conducting part 191. In other words, in the pixel writing period in the pixel display, for example, the voltage V0 is applied from the upper/lower-electrode driver 113 (see FIG. 1) to the lower electrode 32, and the voltage V0 is applied from the upper/lower-electrode driver 113 to the conductive layer 60.

[Structure Example of Upper Electrode and Lower Electrode]

FIG. 8 illustrates a structure example of the upper electrode 31 and the lower electrode 32 applicable to the first embodiment and the first to third modification examples of the first embodiment. Note that FIG. 8 illustrates a schematic shape for three pixels of R, G, and B. A first rubbing direction Rub and a direction in which the slit S extends, that is, an extending direction of the slit S, are in parallel to the X direction. For example, the structure A and the structure α are adopted in the first embodiment, while the structure B and the structure β are adopted in the first modification example of the first embodiment.

In the structure A, it is assumed that the upper electrode 31 is referred to an upper electrode 31A and the lower electrode 32 is referred to a lower electrode 32A. At this time, in the structure A, the upper electrode 31A is the pixel electrode PIX, and the lower electrode 32A is the common electrode COM. The upper electrode 31A serving as the pixel electrode PIX is formed for each pixel. A shape of the upper electrode 31A formed for each pixel is a rectangular shape. In the upper electrode 31A, an opening 50 including a plurality of slits S is formed. Also, at, for example, a portion on one side of the upper electrode 31A in the Y direction, a connecting part 1001 to be connected to a drain terminal of the TFT part is provided. The lower electrode 32A serving as the common electrode COM is a solid layer formed on a region including a plurality of pixels such as the entire screen. Also, a conduction hole 1002 is formed for each pixel in the lower electrode 32A so as to correspond to the position of the connecting part 1001 formed for each pixel in the upper electrode 31A.

In the structure B, it is assumed that the upper electrode 31 is referred to as an upper electrode 31B and the lower electrode 32 is referred to as a lower electrode 32B. At this time, in the structure B, the upper electrode 31B is the common electrode COM, and the lower electrode 32B is the pixel electrode PIX. The upper electrode 31B serving as the common electrode COM is a solid layer formed on a region including a plurality of pixels such as the entire screen. Also, in the upper electrode 31B, an opening 50 including the slits S are formed for each pixel. The lower electrode 32B serving as the pixel electrode PIX is formed for each pixel. A shape of the lower electrode 32B is a rectangular shape. Also, at, for example, a portion on one side of the lower electrode 32B in the Y direction, a protruding part serving as a connecting part 1001 to be connected to a drain terminal of the TFT part is provided.

As the shapes of the upper electrode 31, the lower electrode 32, and the opening 50 on the X-Y plane, the structure α has an alternate both-side comb teeth shape formed of the slits S extending in the X direction, and the structure β3 has a one-side comb teeth shape formed of the slits S extending in the X direction.

Figure 9:
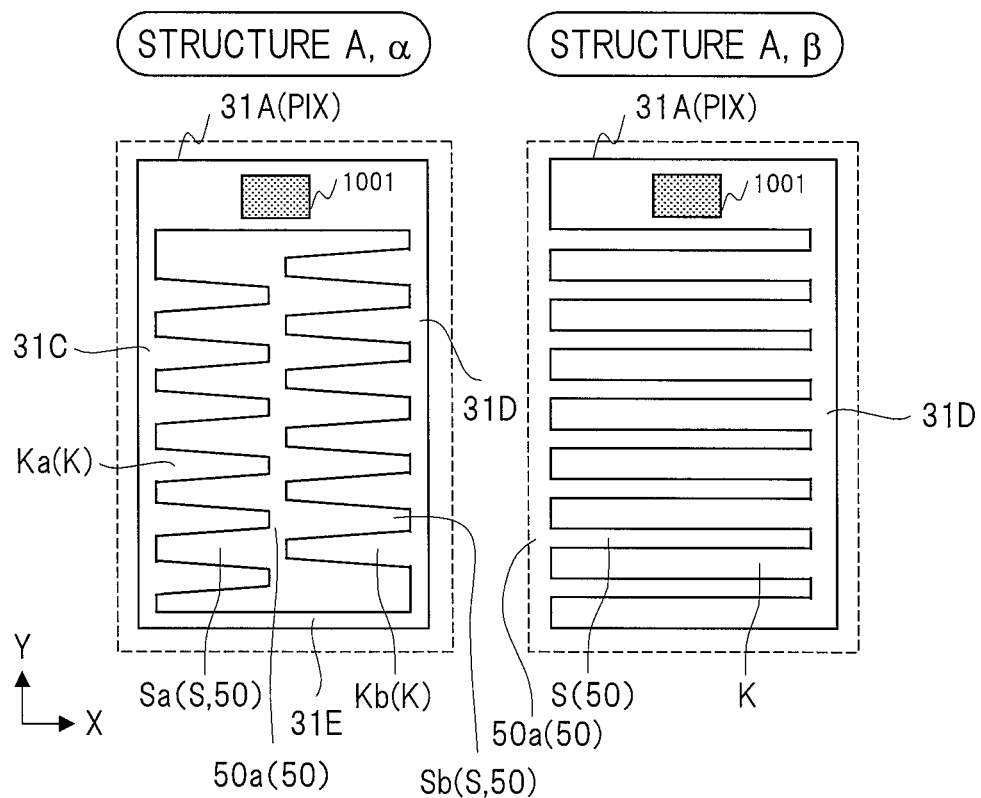
FIG. 9 is diagrams illustrating structure examples (a) and (b) of an upper electrode and an opening in a case of a structure A.

Items (a) and (b) of FIG. 9 illustrate structure examples of the upper electrode 31, the lower electrode 32, and the opening 50 for each pixel in the case of the structure A. The item (a) of FIG. 9 illustrates the upper electrode 31A serving as the pixel electrode PIX in the case of the structure A and the structure α. The item (b) of FIG. 9 illustrates the upper electrode 31A serving as the pixel electrode PIX in the case of the structure A and the structure β3.

The upper electrode 31A serving as the pixel electrode PIX of the item (a) of FIG. 9 has a both-side comb teeth shape in the opening 50 as illustrated therein, the both-side comb teeth shape being obtained by alternately providing the plurality of slits S in the X direction on both left and right sides in the X direction of the opening serving as a Y-direction axis. Compared with the opening in the Y direction, one end sides of the plurality of left and right slits S are commonly connected to each other as being opened. In other words, the opening 50 includes a communicating opening 50a, a plurality of slits Sa, and a plurality of slits Sb. The communicating opening 50a extends in the Y direction. Each of the plurality of slits Sa is connected to one side of the communicating opening 50a in the X direction, is extended in the X direction, and is aligned in the Y direction. Each of the plurality of slits Sb is connected to the other side of the communicating opening 50a in the X direction, is extended in the X direction, and is aligned in the Y direction. And, the opening 50 is formed in the both-side comb teeth shape so that the slits Sa and the slits Sb are alternately connected to the communicating opening 50a.

A shape of an electrode part of the upper electrode 31A is a shape in which comb teeth "K" which are a plurality of protruding parts in the X direction extend from each of left and right sides of the rectangle to the inside of the pixel. In other words, the upper electrode 31A includes an extending part 31C, an extending part 31D, a plurality of comb teeth Ka, and a plurality of comb teeth Kb. The extending part 31C extends in the Y direction. The extending part 31D extends in the Y direction, and face the extending part 31C. Each of the plurality of comb teeth Ka protrudes from the extending part 31C to the extending part 31D, and is aligned in the Y direction. Each of the plurality of comb teeth Kb protrudes from the extending part 31D to the extending part 31C, and is aligned in the Y direction.

Also, in the example illustrated in the item (a) of FIG. 9, each shape of the comb teeth K and the slits S is a trapezoidal shape in a planar view. Note that a lower side in the Y direction of the item (a) of FIG. 9 is closed by the electrode part of the upper electrode 31A. However, the lower side may be opened. In other words, in the example illustrated in the item (a) of FIG. 9, the upper electrode 31A includes an extending part 31E extending in the X direction and connecting between an end of the extending part 31C on an opposite side of the connecting part 1001 side and an end of the extending part 31D on an opposite side of the connecting part 1001 side. And, the opening 50 is not connected to the outside of the upper electrode 31A on the side opposite to the connecting part 1001 side of the opening 50. However, the extending part 31E may be not provided, and the opening 50 may be connected to the outside of the upper electrode 31A.

The upper electrode 31A serving as the pixel electrode PIX of the item (b) of FIG. 9 has the one-side comb teeth shape so that the comb teeth K which are the plurality of protruding parts in the X direction protrude leftward from the side extending in the Y direction and being positioned on the right side of the rectangular shape in the X direction. In other words, the upper electrode 31A includes an extending part 31D and the plurality of comb teeth K. The extending part 31D extends in the Y direction. Each of the plurality of comb teeth K is protruded from the extending part 31D to one side in the X direction, is extended in the X direction, and is aligned in the Y direction. And, the upper electrode 31A is formed in the one-side comb teeth shape.

Also, the opening 50 has a the shape in which the plurality of slits S extending in the X direction are connected to a right side of the opening extending in the Y direction and being positioned on the left side thereof in the X direction. One end side of each of the plurality of slits S is commonly opened. In other words, the opening 50 includes a communicating opening 50a and the plurality of slits S. The communicating opening 50a extends in the Y direction. Each of the plurality of slits S is connected to the other side of the communicating opening 50a in the X direction, is extended in the X direction, and is aligned in the Y direction. And, the opening 50 has the one-side comb teeth shape. Also, in the example illustrated in the item (b) of FIG. 9, each shape of the comb teeth K and the slits S is a rectangular shape in the planar view.

In the items (a) and (b) of FIG. 9, the opening 50 is an opening for the whole pixel formed by the overlap of the upper electrode 31A serving as the pixel electrode PIX and the lower electrode 32A serving as the common electrode COM (see FIG. 8). The opening 50 is a portion in a region between the electrode parts of the upper electrode 31A in the X-Y planar view, the portion where the upper electrode 31A serving as the pixel electrode PIX does not overlap above the lower electrode 32A serving as the common electrode COM. Note that the opening 50 does not mean an effective region for the display in the pixel region. The slits S are slits each extending in the X direction, in other words, openings, gaps, or others. Each slit S is formed of a pair of comb teeth K adjacent to each other in the Y direction.

Figure 10:
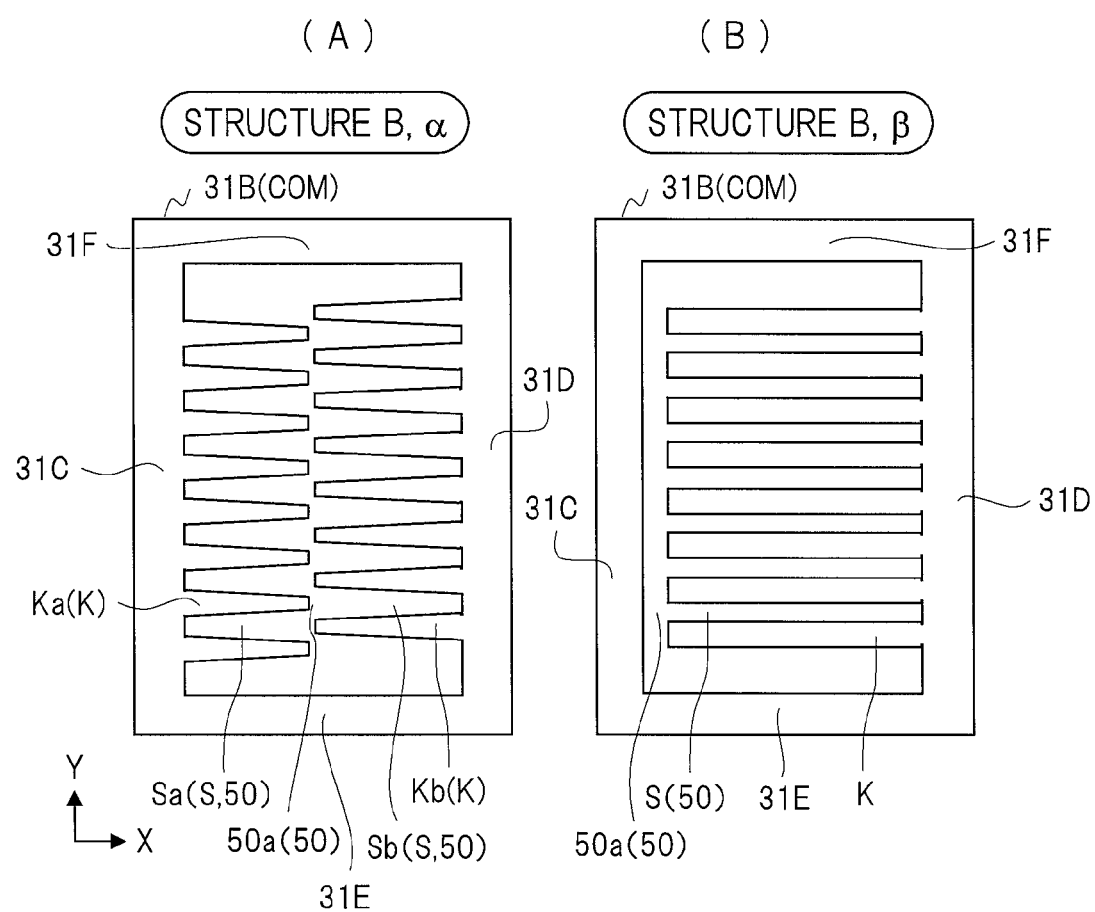
FIG. 10 is diagrams illustrating structure examples (a) and (b) of an upper electrode and an opening in a case of a structure B.

Items (a) and (b) of FIG. 10 illustrate structure examples of the upper electrode 31B and the opening 50 for each pixel in the case of the structure B. The item (a) of FIG. 10 illustrates the upper electrode 31B serving as the common electrode COM in the case of the structure B and the structure α. The item (b) of FIG. 10 illustrates the upper electrode 31B serving as the common electrode COM in the case of the structure B and the structure β3.

The upper electrode 31B serving as the common electrode COM of the item (a) of FIG. 10 has an alternate both-side comb teeth shape in the opening 50 as illustrated therein as similar to that of the opening 50 of the upper electrode 31A of the item (a) of FIG. 9. That is, the opening 50 includes a communicating opening 50a, a plurality of slits Sa, and a plurality of slits Sb. The communicating opening 50a extends in the Y direction. Each of the plurality of slits Sa is connected to one side of the communicating opening 50a in the X direction, is extended in the X direction, and is aligned in the Y direction. Each of the plurality of slits Sb is connected to the other side of the communicating opening 50a in the X direction, is extended in the X direction, and is aligned in the Y direction. And, the opening 50 is formed in the both-side comb teeth shape so that the slits Sa and the slits Sb are alternately connected to the communicating opening 50a. On the other hand, the upper electrode 31B includes an extending part 31C, an extending part 31D, a plurality of comb teeth Ka, and a plurality of comb teeth Kb. The extending part 31C extends in the Y direction. The extending part 31D extends in the Y direction, and face the extending part 31C. Each of the plurality of comb teeth Ka protrudes from the extending part 31C to the extending part 31D, and is aligned in the Y direction. Each of the plurality of comb teeth Kb protrudes from the extending part 31D to the extending part 31C, and is aligned in the Y direction.

The upper electrode 31B serving as the common electrode COM of the item (b) of FIG. 10 has the one-side comb teeth shape in the opening 50 as illustrated therein as similar to the opening 50 of the upper electrode 31A of the item (b) of FIG. 9. That is, the upper electrode 31B includes the extending part 31C, an extending part 31D, and the plurality of comb teeth K. The extending part 31C extends in the Y direction. The extending part 31D extends in the Y direction, and face the extending part 31C. Each of the plurality of comb teeth K is protruded from the extending part 31D to the extending part 31C, is extended in the X direction, and is aligned in the Y direction. And, the upper electrode 31B is formed in the one-side comb teeth shape. On the other hand, the opening 50 includes a communicating opening 50a and the plurality of slits S. The communicating opening 50a is formed so as to be adjacent to the extending part 31C on the extending part 31D side and so as to extend in the Y direction. Each of the plurality of slits S is connected to the communicating opening 50a on the extending part 31D side, is extended in the X direction, and is aligned in the Y direction. And, the opening 50 has the one-side comb teeth shape.

Note that the upper and lower sides in the Y direction in the items (a) and (b) of FIG. 10 are closed by the electrode part of the upper electrode 31B. However, they may be opened. In other words, in the examples illustrated in the items (a) and (b) of FIG. 10, the upper electrode 31B includes an extending part 31E and an extending part 31F. The extending part 31E extends in the X direction, and connects between the extending part 31C and the extending part 31D on one sides of the plurality of comb teeth K in the Y direction. The extending part 31F extends in the X direction, and connects between the extending part 31C and the extending part 31D on the other sides of the plurality of comb teeth K in the Y direction. And, the opening 50 is not connected to an opening formed in an adjacent pixel in the Y direction. However, either or both of the extending parts 31E and 31F may not be provided, and the opening 50 may be connected to the opening formed in the adjacent pixel in the Y direction.

Note that the actual numbers, sizes, and others of comb teeth K and slits S are adjusted in accordance with the pixel design. Also, the present invention is not limited to the aspect described above, and aspects of various combinations are possible. For example, each shape of the comb teeth K and the slits S in the structure α may be a rectangular shape, or each shape of the comb teeth K and the slits S in the structure β may be a trapezoidal shape.

[Planar Structure Example (1)]

FIG. 11A illustrates a planar structure example on the X-Y plane of a pixel, that is, a cell in the structure A and the structure α so as to correspond to the liquid crystal panel 1 of the second modification example of the first embodiment. FIG. 11A illustrates three pixels for R, G, and B. As illustrated in the drawing, the first rubbing direction Rub which is a rubbing direction on the array substrate 10 side is in parallel to the X direction which is the extending direction of the slits S as a direction from left to right in the drawing.

On the array substrate 10 side, a plurality of gate lines 41 serving as electrode lines in parallel to the X direction and a plurality of data lines 42 serving as electrode lines in parallel to the Y direction are provided, and these gate lines 41 and data lines 42 cross each other so that a plurality of pixels are partitioned. Such each of pixel is also referred to as a sub-pixel. In the X-Y planar view, a shape of the pixel, that is, a shape of the opening except for the light-shielding film 22 portion is a longitudinally-elongated rectangular shape so that a length in the Y direction is longer than a length in the X direction. Such a shape corresponds to an RGB stripe arrangement as the pixel arrangement.

Each of the pixels is explained below. A TFT part 43 is arranged in vicinity of a crossing region where the gate line 41 and the data line 42 cross each other. In the present example, the TFT part 43 is arranged on an upper-left side on the sheet with respect to the pixel. The TFT part 43 includes a TFT element, and the data line 42 is connected to a source terminal of the TFT element, the gate line 41 is connected to a gate terminal of the TFT element, and the pixel electrode PIX is connected to a drain terminal of the TFT element.

The light-shielding film 22 includes a transverse light-shielding film part 22A in parallel to the X direction and a longitudinal light-shielding film part 22B in parallel to the Y direction, and partitions the pixels into a lattice shape. The transverse light-shielding film part 22A is arranged to overlap the gate line 41 and the TFT part 43 when viewed from the Z direction. The longitudinal light-shielding film part 22B is arranged to overlap the data line 42 when viewed from the Z direction.

The color filter 23 is a layer for color separation of the transmitted light of the liquid crystal layer 30, and is formed of color filters 23r, 23g, and 23b which are layers classified to be colored into R (red), G (green), and B (blue), respectively, for each pixel line in the Y direction correspondingly to the pixel arrangement. Note that a delta arrangement, a diagonal arrangement, and a rectangle arrangement are also possible as other pixel arrangements. Further, the number of color types of the color filter 23 is not limited to the three colors of R, G, and B, and may be one, two, four, or others.

In the pixel of FIG. 11A, the upper electrode 31 serving as the pixel electrode PIX has the opening 50 having the alternate both-side comb teeth shape as illustrated in the item (a) of FIG. 9. In accordance with the pixel arrangement described above, for example, in the case of the second modification example of the first embodiment, the lower electrode 32 which is the solid layer serving as the common electrode COM and the lattice-shaped light-shielding film 22 on one side of the lower electrode 32 in the Z direction, that is, above the lower electrode 32, are set to have the same potential as each other. In this manner, the liquid crystal orientation is stabilized in a lattice-shaped region where the light-shielding film 22 is formed and a region in vicinity of the light-shielding film 22 on the X-Y plane. For example, the liquid crystal orientation is stabilized also in the slits S arranged in the pixel region adjacent to the side of the transverse light-shielding film part 22A.

A rubbing process for the anti-parallel orientation is performed to the orientation layers, that is, the first and second orientation films so that the orientation state of the liquid crystal of the liquid crystal layer 30 obtained when no potential difference is provided between the upper electrode 31 and the lower electrode 32, that is, the initial orientation state is a predetermined orientation state supporting the high-speed transverse electric filed mode. The first orientation film between the liquid crystal layer 30 and the electrode layer including the upper electrode 31 and the lower electrode 32 on the array substrate 10 side is subjected to the rubbing process in the first rubbing direction Rub parallel to the X direction which is the extending direction of the slits S. The first rubbing direction Rub is a direction from left to right in the drawing. The second orientation film between the liquid crystal layer 30 and the facing substrate 20 is subjected to the rubbing process in a second rubbing direction opposite to the first rubbing direction Rub for the first orientation film. The liquid crystal of the liquid crystal layer 30 is made of, for example, nematic liquid crystal having negative dielectric anisotropy. In this case, the first rubbing direction Rub on the array substrate 10 side is set as a direction substantially parallel to the X direction which is the extending direction of the slits S as described above. Note that, if nematic liquid crystal having a positive dielectric anisotropy is used, the first rubbing direction Rub is set as a direction substantially orthogonal to the X direction which is the above-described extending direction of the slits S. Note that the first rubbing direction Rub is not limited to the direction completely parallel or orthogonal to the X direction which is the extending direction of the slits S. As an angle formed by the X direction with the first rubbing direction Rub, an angle to some degrees such as 1 degree is allowable.

[Planar Structure Example (2)]

FIG. 11B illustrates a planar structure example of a pixel on the X-Y plane in the case of the structure A and the structure β, corresponding to the liquid crystal panel 1 of the second modification example of the first embodiment or others. In the pixel of FIG. 11B, the upper electrode 31 serving as the pixel electrode PIX has the opening 50 having the one-side comb teeth shape described by using the item (b) of FIG. 9.

In accordance with the pixel structure described above, in the case of, for example, the second modification example of the first embodiment, the lower electrode 32 serving as the common electrode COM and the lattice-shaped light-shielding film 22 on one side of the lower electrode 32 in the Z direction, that is, above the lower electrode 32, are set to have the same potential. In this manner, on the X-Y plane, the orientation of the liquid crystal is stabilized in the lattice-shaped region where the light-shielding film 22 is formed and the region in the vicinity of the light-shielding film 22.

[Planar Structure Example (3)]

FIG. 11C illustrates a planar structure example of a pixel on the X-Y plane in the case of the structure B and the structure α, corresponding to the first modification example of the first embodiment or others. In the pixel of FIG. 11C, the upper electrode 31 serving as the common electrode COM has the opening 50 having the alternate both-side comb teeth shape described by using the item (a) of FIG. 10.

In accordance with the pixel structure described above, in the case of, for example, the first modification example of the first embodiment, the upper electrode 31 serving as the common electrode COM and the lattice-shaped light-shielding film 22 on one side of the upper electrode 31 in the Z direction, that is, above the upper electrode 31, are set to have the same potential. In this manner, on the X-Y plane, the orientation of the liquid crystal is stabilized in the lattice-shaped region where the light-shielding film 22 is formed and the region in the vicinity of the light-shielding film 22.

[Planar Structure Example (4)]

Figure 11D:
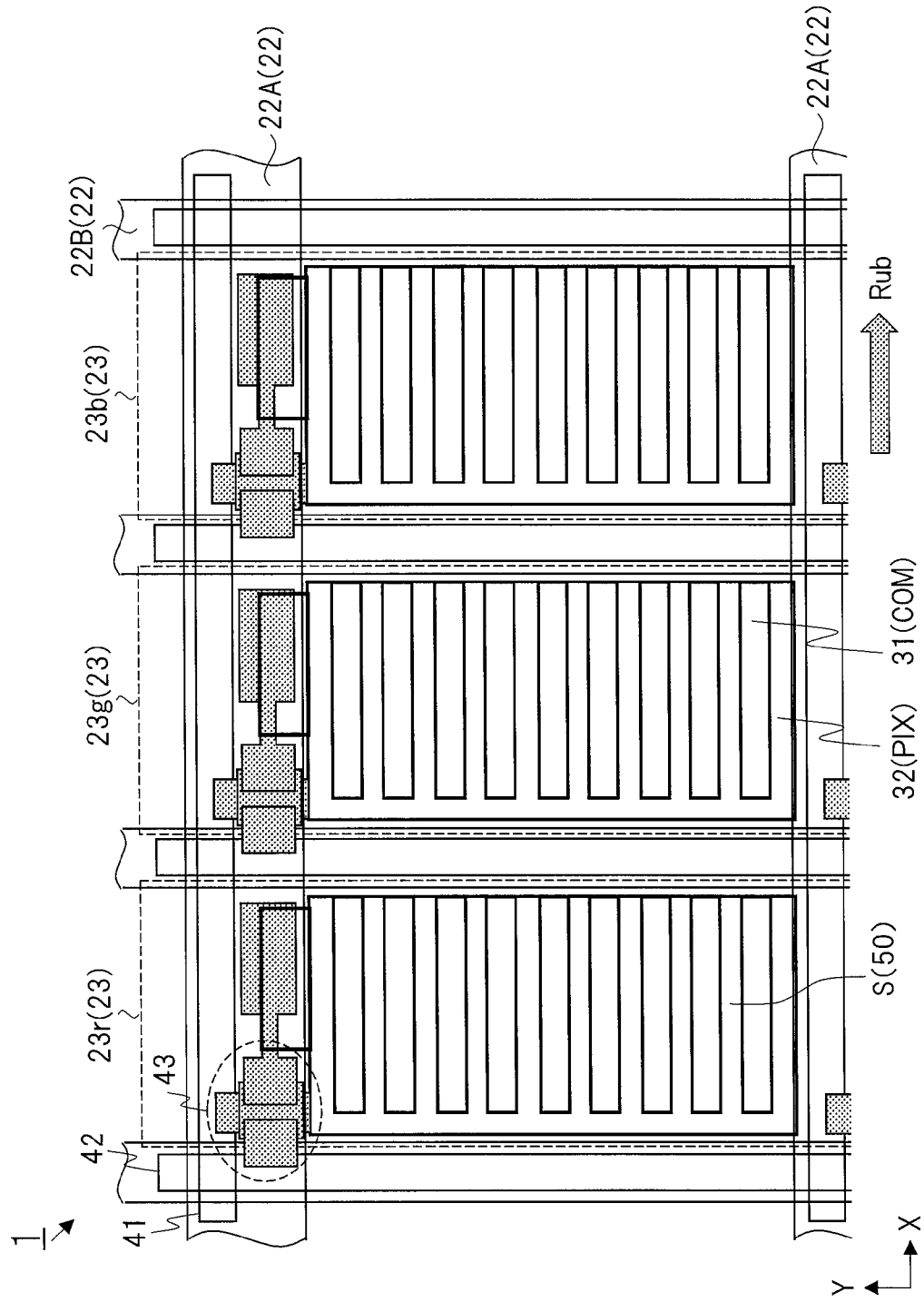
FIG. 11D is a diagram illustrating a plan structure example of pixels in a case of the structure B and the structure β.

FIG. 11D similarly illustrates a planar structure example of a pixel on the X-Y plane in the case of the structure B and the structure β, corresponding to the first modification example of the first embodiment or others. In the pixel of FIG. 11D, the upper electrode 31 serving as the common electrode COM has the opening 50 having the one-side comb teeth shape as illustrated in the item (b) of FIG. 10.

In accordance with the pixel structure described above, in the case of, for example, the first modification example of the first embodiment, the upper electrode 31 serving as the common electrode COM and the lattice-shaped light-shielding film 22 on one side of the upper electrode 31 in the Z direction, that is, above the upper electrode 31, are set to have the same potential. In this manner, on the X-Y plane, the orientation of the liquid crystal is stabilized in the lattice-shaped region where the light-shielding film 22 is formed and the region in the vicinity of the light-shielding film 22.

[Regarding Method of Driving Liquid Crystal]

In the liquid crystal panel 1 of any of the first embodiment and the first to third modification examples of the first embodiment, the opening 50 including the plurality of slits S is formed in the electrode layer including the upper electrode 31 and the lower electrode 32 as illustrated in FIGS. 8 to 10 and 11A to 11D. As illustrated in FIGS. 8 to 10 and 11A to 11D, the slits S extend in the transverse direction corresponding to a horizontal direction of the screen, that is, in the X direction. The high-speed transverse electric field mode which is a method of driving the liquid crystal supporting this electrode layer and the opening 50 is a method for achieving high-speed responsiveness and others by the orientation process for the anti-parallel orientation supporting the X direction which is the extending direction of the slits S. Details about this high-speed transverse electric field mode will be described later by using FIGS. 13 to 15.

And, in the first embodiment and the first to third modification examples of the first embodiment, for example, the same voltage V0 is applied in the usage of the liquid crystal display function so that the two types of layers of the lower electrode 32 and the conductive layer 60 have the same potential. In this manner, in the X-Y planar view, the orientation stability of the liquid crystal can be improved in regions including vicinity of the conducive layer 60. In other words, in the X-Y planar view, the orientation of the liquid crystal can be stabilized in the region where the conductive layer 60 is formed and the region in the vicinity of the conductive layer 60. That is, the response speed in the pixel display can be increased, and the display quality can be improved.

Figure 12:
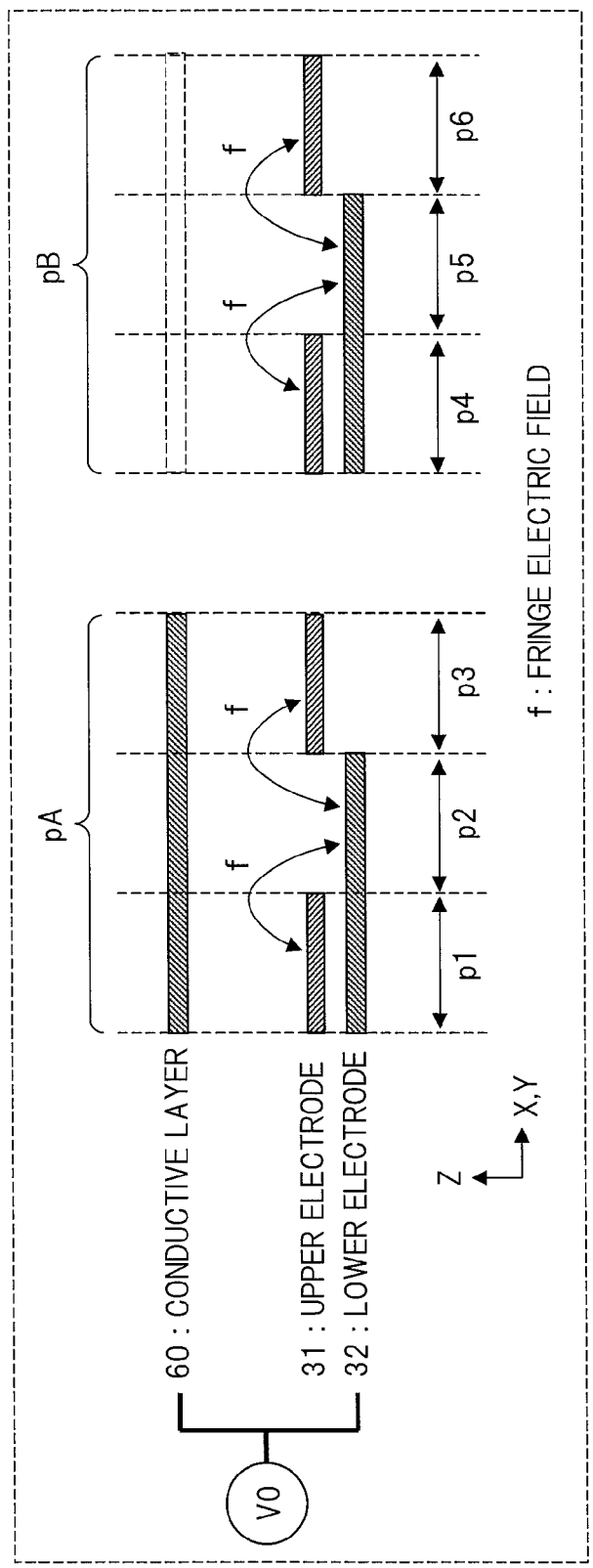
FIG. 12 is a diagram illustrating a layout pattern of overlap or others among the upper electrode, the lower electrode, and a conductive layer in X, Y, and Z spaces.

FIG. 12 illustrates arrangement patterns such as overlap in X, Y, and Z spaces regarding the upper and lower electrodes 31 and 32, and the lower electrode 32 and the conductive layer 60 to be provided with the same potential. Hereinafter, the orientation stability of the liquid crystal in accordance with the patterns will be described. A pattern p1 is a pattern in which the upper electrode 31, the lower electrode 32, and the conductive layer 60 overlap each other when viewed from the Z direction. A pattern p2 is a pattern in which the lower electrode 32 and the conductive layer 60 overlap each other when viewed from the Z direction, and a pattern p3 is a pattern in which the upper electrode 31 and the conductive layer 60 overlap each other when viewed from the Z direction. A reference symbol "f" simply represents the fringe electric field caused in the opening 50 and the liquid crystal layer 30. The patterns p1, p2, and p3 are referred to as a pattern "pA". At this time, in each of the patterns p1, p2, and p3 as the pattern pA, the function and effect of stabilizing the orientation of the liquid crystal is obtained in a space between the lower electrode 32 and the conductive layer 60 to be provided with the same potential.

Also, patterns p4, p5, and p6 are referred to as a pattern "pB". At this time, a pattern of the upper electrode 31 and the lower electrode 32 in each of the patterns p4, p5, and p6 as the pattern pB is similar to the pattern of the upper electrode 31 and the lower electrode 32 in each of the patterns p1, p2, and p3 forming the pattern pA. On the other hand, in the pattern pB, while the upper electrode 31, the lower electrode 32, and the conductive layer 60 do not directly overlap each other when viewed from the Z direction as different from the pattern pA, the pattern pB is a pattern in which the upper electrode 31, the lower electrode 32, and the conductive layer 60 are adjacent to each other in the X and Y directions when viewed from the Z direction. In other words, the pattern pB is a pattern in which the upper electrode 31 and the lower electrode 32 exist in a region adjacent to the conductive layer 60 in the X-Y planar view. Also in the pattern pB, in each of the patterns p4, p5, and p6 forming the pattern pB, the function and effects of stabilizing the orientation of the liquid crystal is obtained in the space between the lower electrode 32 and the conductive layer 60 to be provided with the same potential, that is, in the regions including the region in the vicinity of the conductive layer 60. In other words, the effects of stabilizing the orientation of the liquid crystal is obtained in the region where the conductive layer 60 is formed and the region in the vicinity of the conductive layer 60.

[High-Speed Transverse Electric Field Mode]

Figure 13:
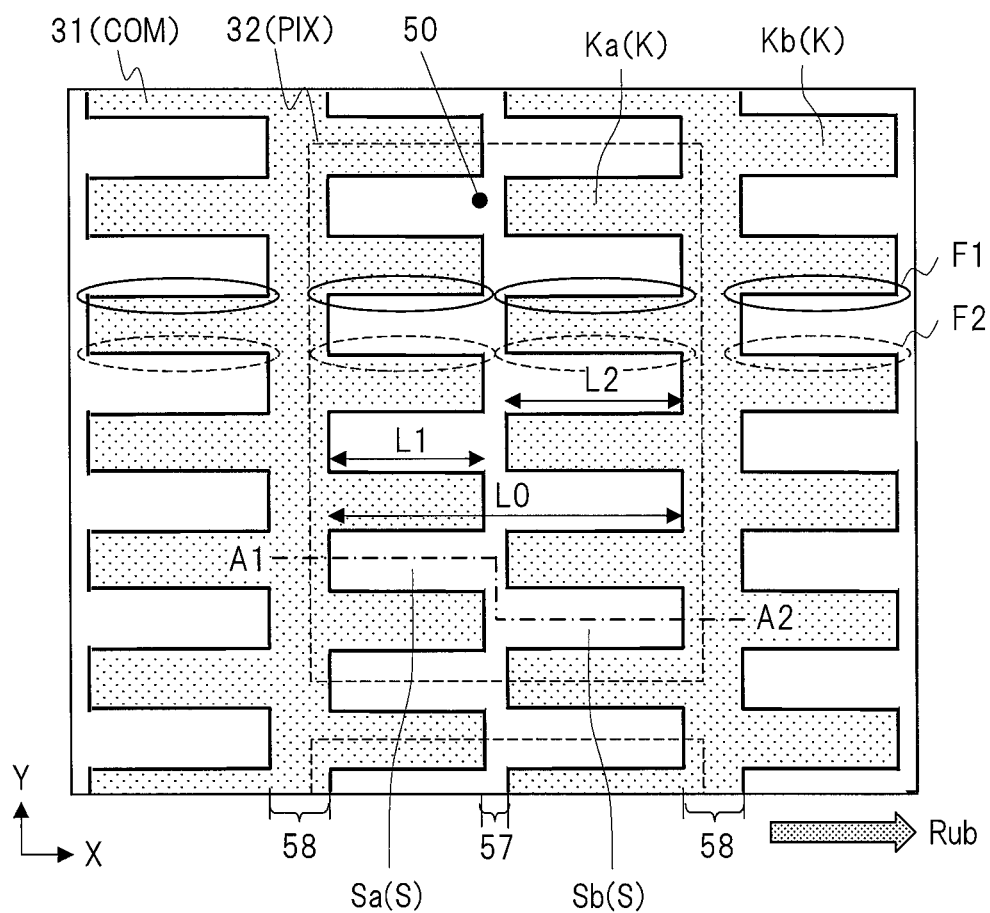
FIG. 13 is a diagram illustrating a plan structure example of pixels in the first embodiment.
Figure 15:
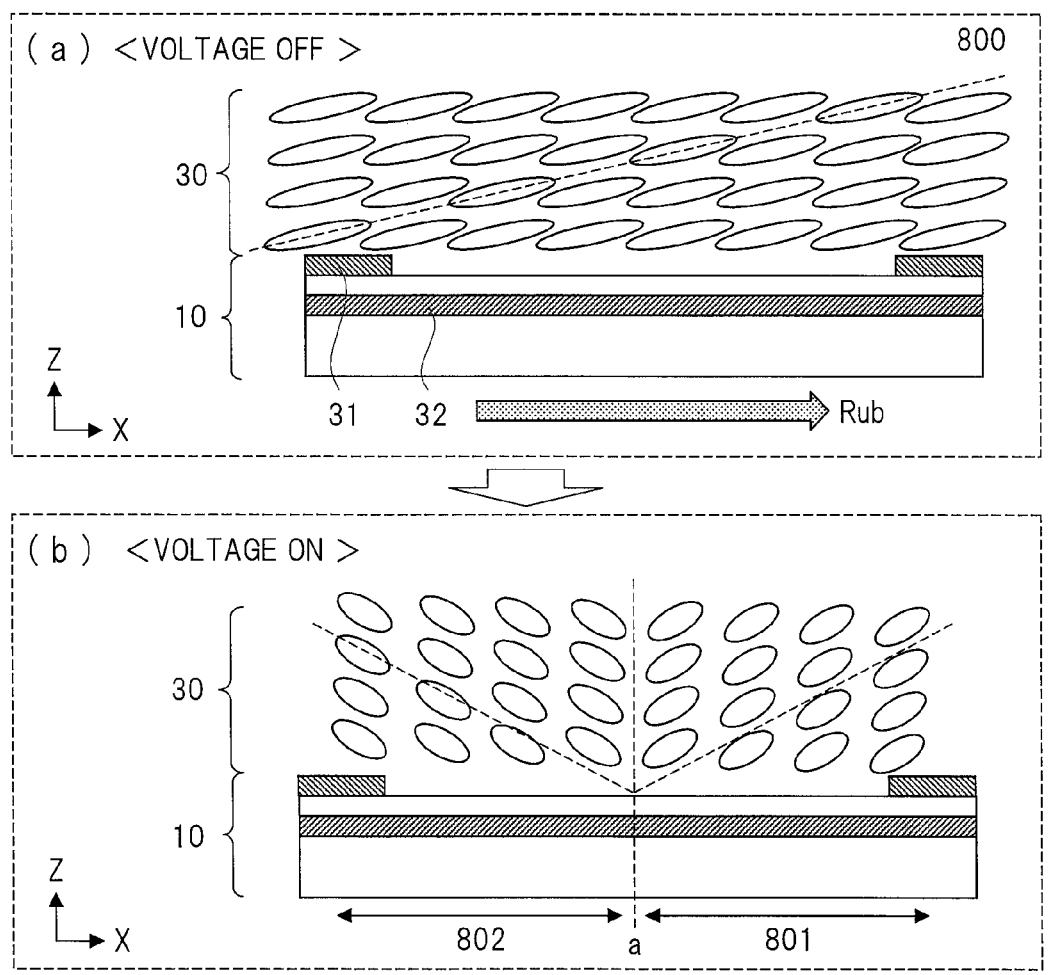

By using FIGS. 13 to 15, liquid crystal orientation of the liquid crystal layer 30 in the high-speed transverse electric field mode of the first embodiment and the first to third modification examples of the first embodiment is described. In other words, the orientation state of the liquid crystal of the liquid crystal layer 30 in the high-speed transverse electric field mode of the first embodiment and the first to third modification examples of the first embodiment is described by using FIGS. 13 to 15.

FIG. 13 illustrates a structure example of the electrode part, the opening 50, and others of the pixel on the X-Y plane so as to correspond to the case of the structure a of FIG. 8. The structure illustrated in FIG. 13 is a structure in which the upper electrode 31 is the common electrode COM and in which the lower electrode 32 is the pixel electrode PIX. The lower electrode 32 serving as the pixel electrode PIX is a rectangular electrode provided for each pixel. The upper electrode 31 serving as the common electrode COM has the electrode part having the both-side comb teeth shape obtained by alternately providing the plurality of comb teeth K which are the protruding parts extending in the X direction with respect to a longitudinal-direction electrode part 58 described later. The opening 50 is formed between the electrode parts of the upper electrode 31 serving as the common electrode COM. As similar to the above description, the opening 50 has the alternate both-side comb teeth shape having the plurality of slits S extending in the X direction.

Each of the slits S extending in the X direction is, for example, a rectangular-shaped opening having a long side with a predetermined length and a short side with a predetermined width. In a plane facing a surface of the lower electrode 32 serving as the pixel electrode PIX in the Z direction, the plurality of slits S are arranged so as to have the same shape and are aligned in the X direction which is the extending direction. In other words, the plurality of slits S extend in the X direction and are aligned in the Y direction. In the X-Y planar view, the opening 50 for each pixel corresponds to the region where the upper electrode 31 serving as the common electrode COM does not overlap the lower electrode 32 in the region where the lower electrode 32 serving as the pixel electrode PIX is formed.

A reference symbol 58 represents an electrode part extending in a longitudinal direction, that is, the Y direction, in the electrode part of the upper electrode 31 having the both-side comb teeth shape, and is referred to as a longitudinal-direction electrode part. The comb teeth Ka are protruding parts of the comb teeth K each protruding to one side of the longitudinal-direction electrode part 58 in the X direction, each extending in the X direction, and being aligned in the Y direction. Also, the comb teeth Kb are protruding parts of the comb teeth K each protruding to the other side of the longitudinal-direction electrode part 58 in the X direction, each extending in the X direction, and being aligned in the Y direction. To the longitudinal-direction electrode part 58, one ends of the plurality of comb teeth Ka and Kb on both ends in the X direction are connected. A shape of the upper electrode 31 is the both-side comb teeth shape in which the comb teeth Ka and Kb are alternately protruded in the X direction toward both sides with centering on the longitudinal-direction electrode part 58. The slits S are formed of a pair of the comb teeth K adjacent to each other in the Y direction.

A reference symbol 57 represents a communication opening of the opening 50 extending in the longitudinal direction, that is, the Y direction, and is referred to as a longitudinal-direction slit. The slit Sa is a slit of the slits S being connected to one side of the longitudinal-direction slit 57 in the X direction and extending in the X direction, and the slit Sb is a slit of the slits S being connected to the other side of the longitudinal-direction slit 57 in the X direction and extending in the X direction. By connecting the plurality of slits Sa and slits Sb to the longitudinal-direction slit 57, a continuous opening is formed. One end of the slit Sa in the X direction is closed by the upper electrode 31 serving as the electrode part, and the other end of the slit Sa in the X direction is opened, that is, connected to the longitudinal-direction slit 57. One end of the slit Sb in the X direction is opened, that is, connected to the longitudinal-direction slit 57, and the other end of the slit Sb in the X direction is closed by the upper electrode 31 serving as the electrode part. A shape of the opening 50 is the both-side comb teeth shape in which the slit Sa and the slit Sb are alternately protruded in the X direction toward both sides with centering on the longitudinal-direction slit 57.

Between the plurality of slits S being at the same position in the X direction and aligned in the Y direction, the positions of both ends of the slits S in the X direction are equalized with each other, so that shapes of the plurality of slits S are the same shape as each other. Also, the plurality of slits S aligned in the Y direction are arranged with a constant pitch in the Y direction. In other words, the plurality of slits S aligned in the Y direction are aligned with the same interval in the Y direction. Also, with centering on the longitudinal-direction slit 57, groups of slits S in adjacent rows to each other in the X direction on left and right are arranged so that the plurality of slits S are alternately shifted from each other in the Y direction. In other words, the slit Sa and the slit Sb are connected to the longitudinal-direction slit 57 so as to be alternately shifted from each other. A degree of this shift is, for example, ½ of the pitch between the slits S in the Y direction. This alternate shape is similar in the electrode part of the upper electrode 31. That is, the comb teeth Ka and Kb are connected to the longitudinal-direction electrode part 58 so as to be alternately shifted from each other. The alternate both-side comb teeth shape of the electrode part of the upper electrode 31 is, in other words, a shape in which the comb teeth K are arranged in zigzag arrangement. Also, the alternate both-side comb teeth shape of the opening 50 is, in other words, a shape in which the slits S are arranged in zigzag (chidori shape in Japanese) arrangement.

In order to configure the liquid crystal display device of the high-speed transverse electric field mode in accordance with the structure of the upper electrode 31 serving as the electrode part and the opening 50, the rubbing process for the anti-parallel orientation is performed for the first and second orientation films serving as the orientation films. That is, the first rubbing direction Rub in the first orientation film on the array substrate 10 side is a direction substantially parallel to the slits S extending in the X direction, that is, from left to right in the drawing, and the second rubbing direction in the second orientation film on the facing substrate 20 side is a direction opposite to the first rubbing direction Rub, that is, from right to left in the drawing.

Also, in FIG. 13, each of reference symbols F1 and F2 represents each region of both side parts of the electrode forming the slit S extending in the X direction. Further, the liquid crystal orientation in the region F1 is different from the liquid crystal orientation in the region F2. The region F1 surrounded by a solid line so as to represent one side part is a region where a rotating direction of the liquid crystal molecules in the substrate plane, that is, in the X-Y plane is a clockwise direction, and the region F2 surrounded by a broken line so as to represent the other side part is a region where the rotating direction of the liquid crystal molecules is reversely a counterclockwise direction. The opening 50 has the alternate both-side comb teeth shape. Each slit S has a pair of long sides facing each other in a width direction, that is, the Y direction. A region in vicinity of the long side on one side is the region F1, and a region in vicinity of the long side on the other side is the region F2. In viewing between the rows of the slits S adjacent to each other in the X direction via the longitudinal-direction slit 57 of the opening 50, that is, between the row of the slit Sa and the row of the slit Sb, the regions with the same rotating directions as each other among the regions F1 and F2 are arranged close to each other in the left and right slits S, that is, in the slit Sa and the slit Sb, because of the alternately-shifted arrangement.

That is, the same type of the regions among the regions F1 and F2 are arranged on the substantially same line in the X direction. In other words, the same type of the regions among the two types of the regions F1 and F2 are lined on the same straight line extending in the X direction so as to be adjacent to each other in the X direction. In the Y direction, the regions F1 and F2 which are the two types of regions are alternately arranged. In other words, the regions F1 and F2 are alternately aligned in the Y direction. In this manner, the regions with the same liquid crystal orientation, that is, the same type of the regions among the regions F1 and F2 are aligned so as to be lined in the X direction, and therefore, the orientation stability of the liquid crystal is increased. In other words, the regions having the same liquid crystal orientation among the regions F1 and F2 are aligned on the same straight line extending in the X direction so as to be adjacent to each other in the X direction in the planar view, and therefore, the orientation stability of the liquid crystal is increased.

In FIG. 13, note that a reference symbol "L0" represents a total length of the slit Sa and the slit Sb including the width of the longitudinal-direction slit 57. The L1 and the L2 represent lengths of the slit Sa and the slit Sb as left and right slits S, respectively. In other words, the length L0 is a total length of the length L1 of the slit Sa in the X direction, the width of the longitudinal-direction slit 57 in the X direction, and the length L2 of the slit Sb in the X direction. Each of the length L1 of the slit Sa and the length L2 of the slit Sb is, for example, in the range of 10 to 60 µm. Also, in a viewpoint of the stabilization of the rotating direction of the liquid crystal molecules, it is preferred that each of the lengths L1 and L2 is in the range of 40 µm or smaller. Each of the width of the slit Sa and the width of the slit Sb is, for example, in the range of 2 to 5 µm, and each of the pitch between the slits Sa and the pitch between the slits Sb is, for example, in the range of 4 to 10 µm. In order to increase the response speed, it is preferred that these widths and pitches are small. Also, when the length L1 of the slit Sa is set to 0, the opening 50 has the one-side comb teeth shape as the structure β.

Also FIG. 13 illustrates the case in which the shape of the opening 50 is a shape which is continuously opened over the pixel line in the Y direction without closing the opening 50 for each pixel. However, the shape of the opening 50 may be a shape in which the opening 50 is closed for each pixel. Further, the shape of the opening 50 can be a shape in which the longitudinal-direction slit 57 is not provided, such as a shape in which the respective openings of the slits S are independent from each other in an island shape. However, by providing the longitudinal-direction slit 57, the liquid crystal panel 1 can be more easily manufactured.

FIG. 14 is diagrams obtained by partially enlarging FIG. 13, illustrating images of the rotation of the liquid crystal molecules in the regions F1 and F2 with the liquid crystal orientation in the two types of the rotating directions described above. An item (a) of FIG. 14 illustrates an image of rotation when the voltage is OFF, that is, in the initial orientation state, and an item (b) of FIG. 14 illustrates an image of rotation when the voltage is ON. In FIG. 14, note that the case in which the voltage is OFF is represented by a term "voltage OFF", and the case in which the voltage is ON is represented by a term "voltage ON". A reference symbol 701 denotes an image of the liquid crystal molecules. As illustrated in the drawings, the regions F1 and F2 represent vicinity regions including the both side parts of the electrode forming the slit S, that is, vicinity regions centering on the long sides facing each other in the Y direction which is the width direction of the slit Sa and the slit Sb. For example, the slit Sa connected to one side of the longitudinal-direction slit 57 in the X direction has a long side a1 on one side in the Y direction and a long side a2 on the other side in the Y direction. Also, each of the comb teeth Ka serving as the protruding part arranged on one side of the slit Sa in the X direction has a long side a3 on one side in the Y direction and a long side a4 on the other side in the Y direction. And, the long sides a1 and a3 in the X direction are aligned on the substantially same line, and the long sides a2 and a4 in the X direction are aligned on the substantially same line. In other words, the long sides a1 and a3 are aligned on the same straight line extending in the X direction.

One end of the slit S in the X direction is closed by the upper electrode 31 serving as the electrode part, and the other end of slit S in the X direction is connected to the longitudinal-direction slit 57. In each long side such as the long sides a1 facing each other in the Y direction which is the width direction of the slit S, one end side of the long side forms a corner closed by the electrode part of the upper electrode 31, and the other end side thereof forms a corner opened to the longitudinal-direction slit 57. Two long sides of one slit S form two corners at an intersection point with the longitudinal-direction slit 57. These corners have a function serving as an electric field control part, that is, a function of stabilizing the liquid crystal orientation or the rotating direction. The orientation is stabilized at these corners serving as the electric field control parts by setting the rotating direction of the liquid crystal molecules to be, for example, clockwise in a region in vicinity of a line from the closed corner to the opened corner in the long side such as the long side a1 of each slit S, that is, in the region F1. That is, the rotating directions of the liquid crystal molecules are the same as each other in the regions F1 which are the regions in the vicinity of the long sides a1 and a3 aligned on the line in the X direction, so that the orientation is stabilized. On the other hand, in the region F2 which is a region in vicinity of the long side a2 adjacent to the long side a1 in the Y direction, the rotating directions of the liquid crystal molecules are set to be, for example, counterclockwise, and are reverse to the rotating directions in the region F1 which is the region in the vicinity of the long side a1 adjacent to the long side a2 in the Y direction. And, such regions F2 are aligned on a line in the X direction, so that the orientation is stabilized. As described above, in the opening 50 having the alternate both-side comb teeth shape including the longitudinal-direction slit 57, by providing the corner serving as the electric filed control part to each slit S, the orientation stability of the liquid crystal of the pixel is increased.

One end of the slit S in the X direction is closed by the upper electrode 31 serving as the electrode part, and the other end of the slit S in the X direction is connected to the longitudinal-direction slit 57. The rotating directions of the liquid crystal molecules are the same as each other to be, for example, clockwise in the regions F1 which are the regions in the vicinity of the long sides a1 and 3 aligned on the same straight line extending in the X direction, so that the orientation of the liquid crystal is stabilized. On the other hand, the rotating directions of the liquid crystal molecules are, for example, counterclockwise in the region F2 which is the region in the vicinity of the long side a2 adjacent to the long side a1 in the Y direction, and are reverse to the rotating directions of the liquid crystal molecules in the region F1 which is the region in the vicinity of the long side a1 adjacent to the long side a2 in the Y direction. And, such regions F2 are aligned on the same line extending in the X direction, so that the orientation of the liquid crystal is stabilized.

In the voltage OFF state illustrated the item (a) of FIG. 14, in the liquid crystal of the liquid crystal layer 30, the long axes of the respective liquid crystal molecules are oriented along the same X direction in the regions F1 and F2 of the facing long sides of the slit S so as to correspond to the first rubbing direction Rub. The voltage is applied to the upper electrode 31 and the lower electrode 32, so that the fringe electric field is caused on the electrode layer of the upper electrode 31 and the lower electrode 32 including the opening 50, and transition from the state shown in the item (a) to the state shown in the item (b) of FIG. 14 is caused by the caused fringe electric field. At this time, the liquid crystal molecules of the liquid crystal layer 30 rise so that the long axes of the liquid crystal molecules are along the Z direction as rotating, that is, twisting, in rotating directions reverse to each other between the region F1 which is the region in the vicinity of the long side on one side of the two facing long sides of each slit S and the region F2 which is the region in the vicinity of the long side on the other side thereof. Note that, in an intermediate region between these two facing long sides of the slit S, the clockwise rotation and the counter-clockwise rotation are mixed as the rotating directions of the liquid crystal molecules.

And, in the voltage ON state of the item (b) of FIG. 14, the rotation states of the liquid crystal molecules in the regions F1 which are the regions in vicinity of the long sides a1 and a3 on one side of the two facing long sides of each slit S are substantially equalized on the same straight line extending in the X direction. Also, the rotation states of the liquid crystal molecules in the regions F2 which are the regions in vicinity of the long sides a2 and a4 on the other side of the two facing long sides of each slit S are substantially equalized on the same straight line extending in the X direction. As described above, on the electrode layer of the upper electrode 31 and the lower electrode 32 including the opening 50, the orientations of the liquid crystal molecules of the liquid crystal layer 30 are controlled so as to be divided into the region F1 and the region F2 which are the regions with the two types of the rotating directions. Accordingly, the response speed obtained when the voltage is applied to the upper electrode 31 and the lower electrode 32 is increased.

FIG. 15 illustrates orientation states of the liquid crystal along an A1-A2 cross-sectional surface of FIG. 13. An item (a) of FIG. 15 illustrates an orientation state of the liquid crystal obtained when the voltage is OFF, that is, in the initial orientation state, and an item (b) of FIG. 15 illustrates an orientation state of the liquid crystal obtained when the voltage is ON. In FIG. 15, note that the case in which the voltage is OFF is represented by a term "voltage OFF", and the case in which the voltage is ON is represented by a term "voltage ON". In the item (a) of FIG. 15, the liquid crystal molecules are oriented so as to along a pretilt direction 800 for forming a predetermined pretilt angle with the first rubbing direction Rub on the array substrate 10 side, that is, the direction from left to right in the drawing. In the liquid crystal molecules, their positions in the Z direction at one end side corresponding to a proceeding direction side of the first rubbing direction Rub, that is, to a right side in the drawing, are on one side in the Z direction, that is, on an upper side in the drawing than their positions in the Z direction at the other end side corresponding to a left side in the drawing. In the transition from the state of the item (a) of FIG. 15 to the state of the item (b) of FIG. 15, the liquid crystal molecules rise so that the long axes of the liquid crystal molecules are along the Z direction as rotating in the X-Y plane as illustrated in FIG. 14. In the item (b) of FIG. 15, a line "a" corresponds to a position of the longitudinal-direction slit 57 (see FIG. 14). In a region 801 on the right side from the line "a" in the drawing, the liquid crystal rises in a positive direction corresponding to the pretilt direction 800. In a region 802 on the left side from the line "a" in the drawing, the liquid crystal rises in an opposite direction. That is, the liquid crystal molecules in the region 802 on the left side in the drawing are more difficult to rise than those in the region 801 on the right side in the drawing, and therefore, have a disadvantage in responsiveness.

Accordingly, more particularly in the case of the anti-parallel orientation, the length L1 of the slit Sa and the length L2 of the slit Sb (see FIG. 13) in the opening 50 are changed so as to satisfy a relation "L1<L2" so that a ratio of the slit Sa which is a portion having the length L1 is decreased. In this manner, the disadvantage in responsiveness in the region 802 on the left side in the drawing can be decreased, and therefore, the response speed obtained when the voltage is applied to the upper electrode 31 and the lower electrode 32 can be increased.

As illustrated in FIGS. 13 to 15, the liquid crystal panel of the first embodiment is the liquid crystal panel of the high-speed transverse electric field mode to which the rubbing process for the anti-parallel orientation is performed in the direction parallel to the X direction which is the extending direction of the slits S in accordance with the structure such as the alternate both-side comb teeth shape having the slits S extending in the X direction in the opening 50. In the present method, when the voltage is applied to the upper electrode 31 and the lower electrode 32, orientation is made so that, the liquid crystal molecules are oriented so as to rise in the Z direction as rotating in the reverse directions from each other in the regions F1 and F2 serving as the vicinity regions of the long side on one side and the long side on the other side among the two long sides facing each other in the Y direction which is the width direction of the slit S extending in the X direction of the opening 50. By this high-speed transverse electric field mode, the response speed of the pixel obtained when the voltage is applied to the upper electrode 31 and the lower electrode 32 is increased, that is, the response time is shortened, and the display quality is enhanced.

<Second Embodiment>

In the first embodiment, the case in which the technique found by the inventor of the present application is applied to a liquid crystal display device and an electronic apparatus has been described. By contrast, in a second embodiment, a case in which the technique found by the inventor of the present application is applied to a liquid crystal display device with a liquid crystal touch sensor and an electronic apparatus equipped therewith will be described.

[Principle of Touch Sensor]

Figure 16:
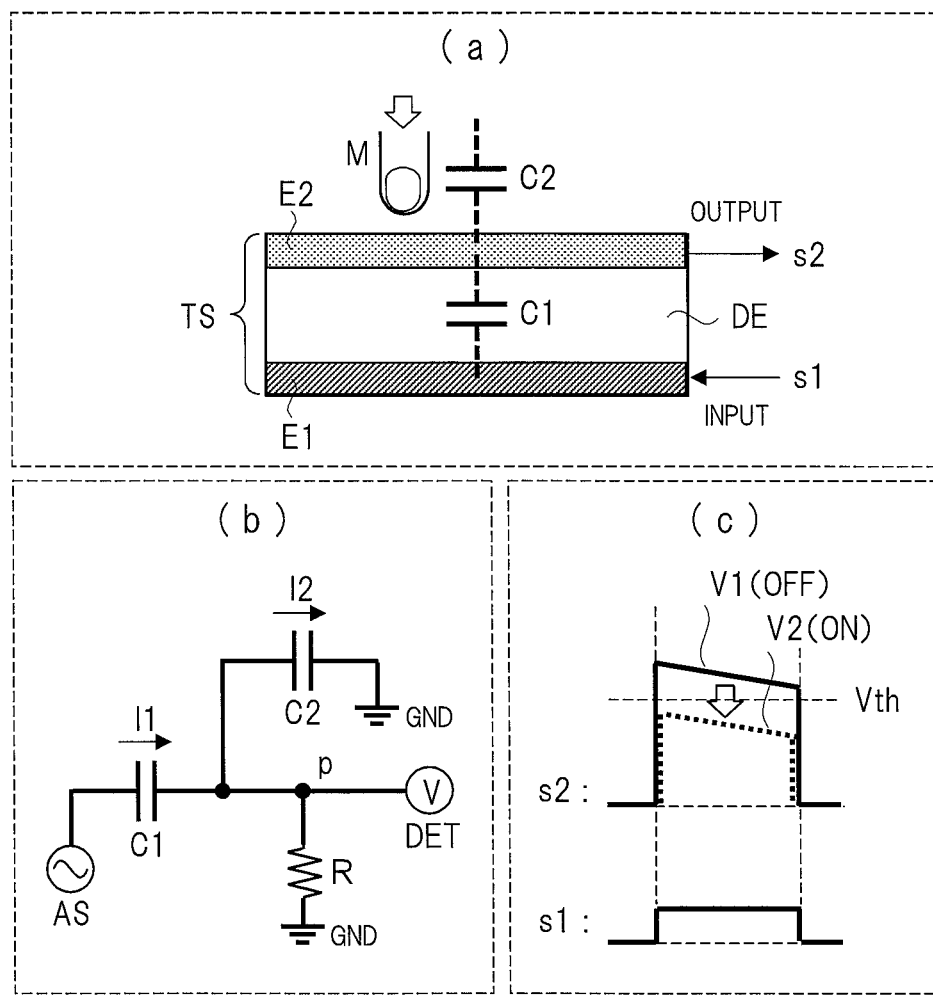
FIG. 16 is diagrams for describing a principle of a capacitive touch sensor of a mutual capacitance type.

First, a principle of a touch sensor will be described. FIG. 16 illustrates a principle of a mutual capacity type of a capacitive touch sensor TS that is applicable to a liquid crystal touch panel 2 (see FIG. 17 described later) of the second embodiment. An item (a) of FIG. 16 illustrates a structure of the touch sensor TS. An item (b) of FIG. 16 illustrates an equivalent circuit of the item (a) of FIG. 16. An item (c) of FIG. 16 illustrates an example of a signal, that is, a voltage obtained in touch detection by the touch sensor TS of the item (a) of FIG. 16. In the item (a) of FIG. 16, the touch sensor TS has a touch drive electrode E1 and a touch detection electrode E2 arranged so as to face each other and interpose a dielectric body DE therebetween, so that a capacitance C1 for the touch detection is formed by them. Note that the touch drive electrode E1 corresponds to a transmission-side electrode 71 (see FIG. 18 described later), and the touch detection electrode E2 corresponds to a reception-side electrode 72 (see FIG. 18 described later). The touch sensor TS detects either a touch or non-touch state, that is, either an ON or OFF state by using change of the capacitance C1 caused by approach or touch of a conductive body M such as a finger on a surface on the touch detection electrode E2 side.

One end of the capacitance C1 in the item (b) of FIG. 16 on the touch drive electrode E1 side is connected to an alternating-current signal source AS, and a point "p" at the other end on the touch detection electrode E2 side is grounded via a resistor "R" and is connected to a voltage detector DET. When the touch sensor TS is operated, an input signal "s1" in the item (c) of FIG. 16 is applied from the alternating-current signal source As to the touch drive electrode E1. The input signal s1 is a touch drive signal. When the input signal s1 is applied, a current "I1" flows via the capacitance C1 of the touch sensor TS, and an output signal "s2" of the item (c) of FIG. 16 is detected by the voltage detector DET on the touch detection electrode E2 side.

In the item (c) of FIG. 16, the input signal s1 is a voltage formed of an alternating-current square wave having a predetermined frequency. The output signal s2 is changed so as to be a voltage V1 in the non-touch state, that is, in the OFF state, and to be a voltage V2 in the touch state, that is, in the ON state. The non-touch state represents a state that the conductive body M is not approaching or touching the touch detection electrode E2 on a front surface side of the touch sensor TS. The touch state represents a state that the conductive body M is approaching to or touching the touch detection electrode E2 on the front surface side of the touch sensor TS. In the non-touch state, that is, the OFF state, during the application of the input signal S1, the current I1 in accordance with a value of the capacitance C1 is flowed by charge/discharge of the capacitance C1, and the voltage detected by the voltage detector DET becomes the voltage V1 of the output signal s2 of the item (c) of FIG. 16. In the item (c) of FIG. 16, the ON state is represented by a term "ON", and the OFF state is represented by a term "OFF".

In the touch state, that is, the ON state, a capacitance C2 formed of the conductive body M is additionally connected in series to the capacitance C1. In this state, the current I1 and a current I2 in accordance with values of the capacitances C1 and C2 are flowed by charge/discharge of the capacitances C1 and C2, respectively, and the voltage detected by the voltage detector DET becomes a voltage V2 of the output signal s2 of the item (c) of FIG. 16. A potential of a point "p" on the touch detection electrode E2 side in the touch state, that is, the ON state, is a potential of a divided voltage defined by the values of the currents I1 and I2 in accordance with the values of the capacitances C1 and C2, respectively. That is, the voltage V2 in the touch state, that is, the ON state, is smaller than the voltage V1 in the non-touch state, that is, the OFF state. A drive circuit for the touch detection for supporting the voltage detector DET compares the voltages V1 and V2 of the output signal s2 with a threshold voltage Vth, and detects the touch state, that is, the ON state, when, for example, the voltage V2 is smaller than the threshold voltage Vth. That is, the output signal s2 is a touch detection signal. Alternatively, the drive circuit for the touch detection for supporting the voltage detector DET compares a change amount from the voltage V1 to the voltage V2 with a different threshold from the threshold voltage, so that the touch/non-touch states are detected.

Note that the liquid crystal touch panel 2 (see FIG. 17 described later) of the second embodiment is not limited to the mutual capacity type of the capacitive touch panel described above, and any type is applicable as long as the transmission-side electrode and the reception-side electrode serving as the conductive layers are used.

[Electronic Apparatus and Liquid Crystal Display Device]

Figure 17:
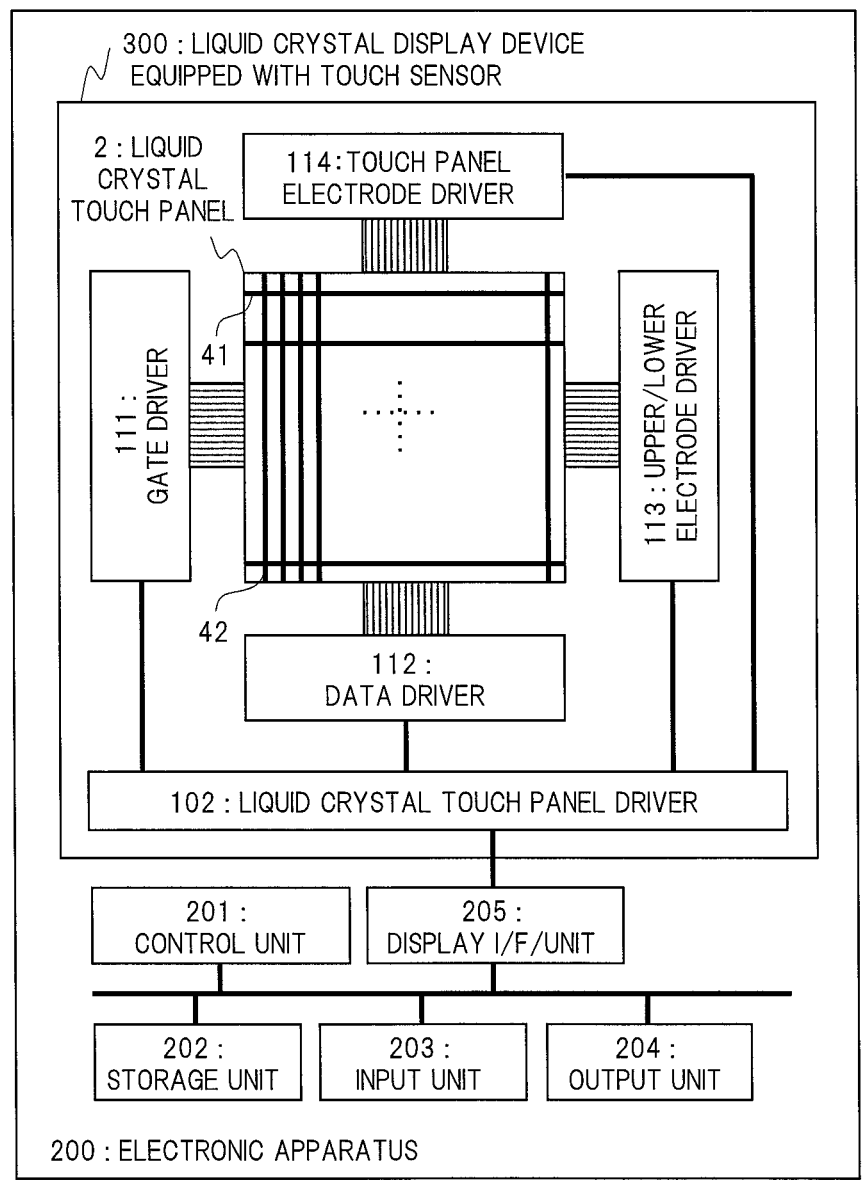
FIG. 17 is a diagram illustrating a block structure of a display device and an electronic apparatus of a second embodiment.

FIG. 17 illustrates a block structure including a liquid crystal display device 300 equipped with a touch sensor serving as a liquid crystal touch panel module, which is the display device of the second embodiment and including an electronic apparatus 200 on which the liquid crystal display device 300 equipped with the touch sensor is mounted. That is, the electronic apparatus 200 of the second embodiment includes the liquid crystal display device 300 equipped with the touch sensor serving as the liquid crystal touch panel module.

The liquid crystal display device 300 equipped with the touch sensor has the liquid crystal touch panel 2. Also, the liquid crystal display device 300 equipped with the touch sensor has: a liquid crystal touch panel driver 102 serving as a controller for main drive control; and a gate driver 111, a data driver 112, an upper/lower-electrode driver 113, and a touch panel electrode driver 114 serving as drivers which are drive circuits for respective electrode lines of the liquid crystal touch panel 2.

The liquid crystal touch panel driver 102 controls a liquid crystal display function and a touch panel function based on a control signal and data serving as control instruction information from the control unit 201. Note that an aspect in which these functions are separated from each other, and are mounted on different drivers, and are linked to each other may be applicable. When the video display is controlled by the liquid crystal display function, the liquid crystal touch panel driver 102 provides the control signal and the data serving as the corresponding control instruction information to each driver for the gate driver 111, the data driver 112, and the upper/lower-electrode driver 113. Also, in the control by the touch panel function, the liquid crystal touch panel driver 102 provides the control signal, the data, and others serving as the control instruction information to the touch panel electrode driver 114, and receives information obtained by the above-described touch detection signal from the touch panel electrode driver 114.

The touch panel electrode driver 114 drives the transmission-side electrode 71 and the reception-side electrode 72 (see FIG. 18 described later) of the liquid crystal touch panel 2 so as to follow the control from the liquid crystal touch panel driver 102. The touch panel electrode driver 114 inputs the input signal s1, which is a touch drive signal, to the transmission-side electrode 71, and detects the output signal S2 as a touch signal in response to the input signal in accordance with the approach or touch of the conductive body M (see FIG. 16) from the reception-side electrode 72. And, for example, the touch panel electrode driver 114 determines the touch/non-touch state and calculates a touch detection position based on the output signal s2 in a touch detection unit TU (see FIG. 18 described later) in a touch panel function layer on the screen. To the liquid crystal touch panel driver 102, the touch panel electrode driver 114 outputs information of results of the determination and the calculation such as information of the touching/non-touching and the touch detection position. Then, from the liquid crystal touch panel driver 102 to the control part 201, the information of the touch detection position and others are responded. Note that the calculation of the touch detection position and others may be performed by the liquid crystal touch panel driver 102 or the control part 201.

[Structure Example of Touch Sensor (1)]

Figure 18:
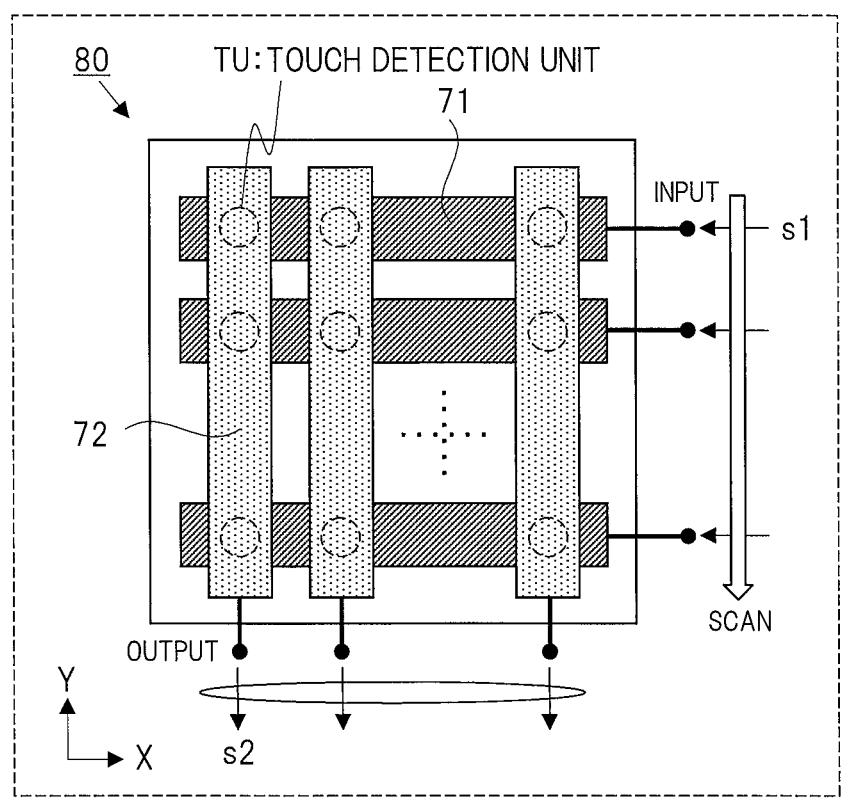
FIG. 18 is a diagram illustrating a first structure example of a touch sensor of the second embodiment or others.

FIG. 18 illustrates a first structure example of the touch sensor for configuring the touch panel function for supporting the liquid crystal touch panel of a second embodiment and a first modification example of the second embodiment described later. That is, FIG. 18 illustrates a first structure example of the touch sensor provided to a liquid crystal display device equipped with a touch sensor of the second embodiment. A reference symbol 80 represents a function layer of the touch sensor. A reference symbol TU represents the touch detection unit configured of the transmission-side electrode 71 and the reception-side electrode 72. In the function layer 80, a plurality of transmission-side electrodes 71 extending in the X direction and aligning in the Y direction are provided on a back surface side, and a plurality of reception-side electrodes 72 extending in the Y direction and aligning in the X direction are provided on a front surface side. In a planar view, an intersection region where each transmission-side electrode 71 and each reception-side electrode 72 intersects each other is the touch detection unit TU. In the planar view, for example, a plurality of pixels are arranged inside a region where one transmission-side electrode 71 is formed. Also, in the planar view, for example, a plurality of pixels are arranged inside a region where one reception-side electrode 72 is formed.

In the touch detection using the touch panel function, the input signal s1 serving as the touch drive signal is sequentially inputted from the touch panel electrode driver 114 (see FIG. 17) to each of the plurality of transmission-side electrodes 71, so that each of the plurality of transmission-side electrodes 71 is sequentially scan-driven. On the other hand, the output signal s2 serving as the touch detection signal is outputted from the plurality of reception-side electrodes 72, and the output signal s2 is detected by the touch panel electrode driver 114. The touch panel electrode driver 114 can detect the touching/non-touching and the touch position in accordance with the approach or the touch of the conductive body M based on a publicly-known calculation process based on the output signal s2.

[Structure Example of Touch Sensor (2)]

Figure 19:
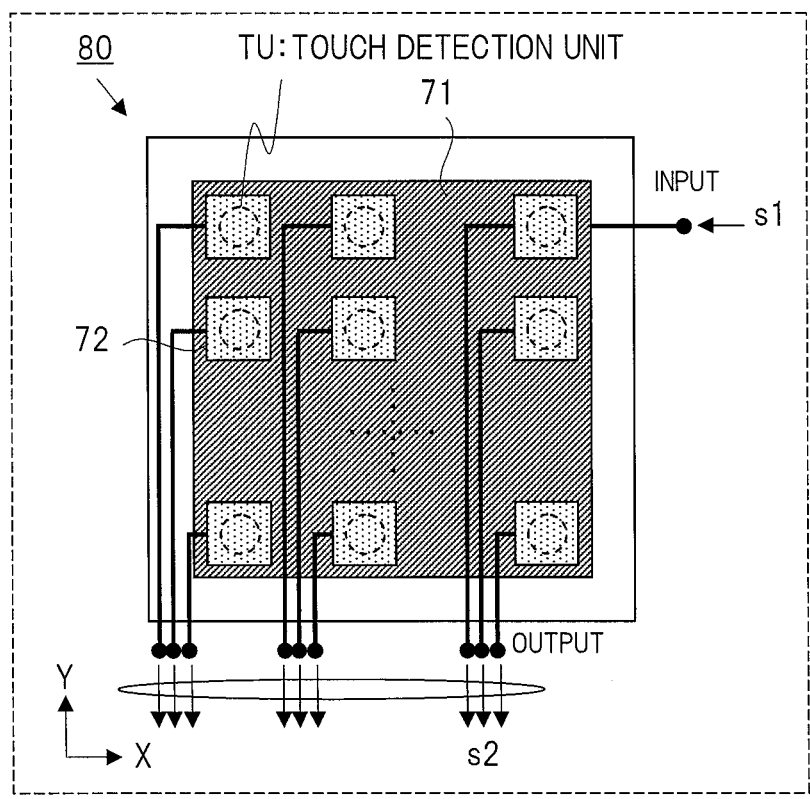
FIG. 19 is a diagram illustrating a second structure example of the touch sensor of the second embodiment or others.

FIG. 19 illustrates a second structure example of the touch sensor for configuring the touch panel function for supporting the liquid crystal touch panel of the second embodiment and the first modification example of the second embodiment described later. That is, FIG. 19 illustrates a second structure example of the touch sensor provided to the liquid crystal display device equipped with the touch sensor of the second embodiment. In the second structure example illustrated in FIG. 19, the transmission-side electrode 71 is formed of, for example, a solid layer formed in regions including the region where the plurality of pixels are formed, such as the region of the entire screen. The reception-side electrodes 72 are arranged in a matrix shape. In a planar view, a plurality of pixels are arranged in the matrix shape in the X and Y directions inside, for example, the region where one reception-side electrode 72 is formed. In the planar view, a region where the reception-side electrode 72 overlaps the transmission-side electrode 71 is the touch detection unit TU. Note that the transmission-side electrode 71 may be provided so as to correspond to each pixel or the transmission-side electrode 71 may correspond to each block so that the plurality of pixels are regarded as one block.

In the touch detection using the touch panel function, the input signal s1 serving as the touch drive signal is inputted from the touch panel electrode driver 114 (see FIG. 17) to the transmission-side electrode 71. On the other hand, the output signal s2 serving as the touch detection signal is outputted from the plurality of reception-side electrodes 72 via a connect line, and the output signal s2 is detected by the touch panel electrode driver 114. The touch panel electrode driver 114 can detect the touch position or others based on the output signal s2 as similar to the first structure example.

[Liquid Crystal Touch Panel of Second Embodiment]

Figure 20:
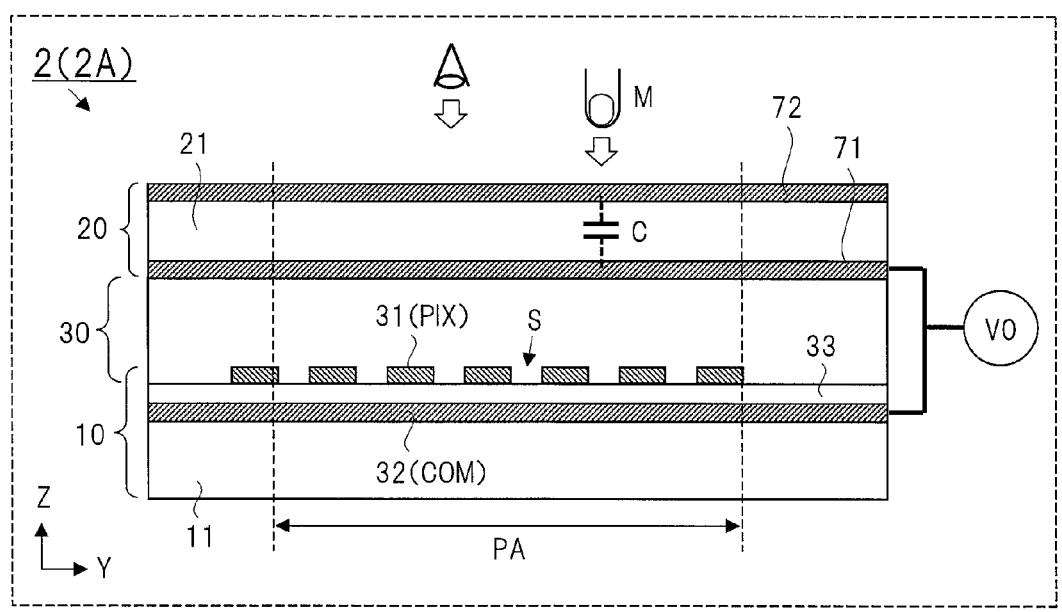
FIG. 20 is a diagram illustrating a schematic structure of a cross-sectional surface of a liquid crystal touch panel of a liquid crystal display device equipped with a touch sensor, which is a display device of the second embodiment.

FIG. 20 illustrates a schematic structure of a cross-sectional surface of the liquid crystal touch panel 2 of the liquid crystal display device equipped with the touch sensor, which is the display device of the second embodiment. The liquid crystal touch panel 2 of the second embodiment is such a liquid crystal touch panel 2 that the transmission-side electrode 71 and the reception-side electrode 72 forming the mutual capacity type of the electrostatic capacitive touch panel function or touch sensor function are provided on the facing substrate 20 side in the liquid crystal panel 1A (see FIG. 2) of the first embodiment. Note that the liquid crystal touch panel 2 of the second embodiment is particularly referred to as a liquid crystal touch panel 2A here. And, in the liquid crystal touch panel 2A of the second embodiment, the lower electrode 32 serving as the common electrode COM on the array substrate side 10 and the transmission-side electrode 71 on the facing substrate 20 side have the same potential as each other. That is, in the liquid crystal touch panel 2A of the second embodiment, the transmission-side electrode 71 is provided as the conductive layer similar to the conductive layer 60 (see FIG. 2) in the liquid crystal panel 1A of the first embodiment.

Figure 22:
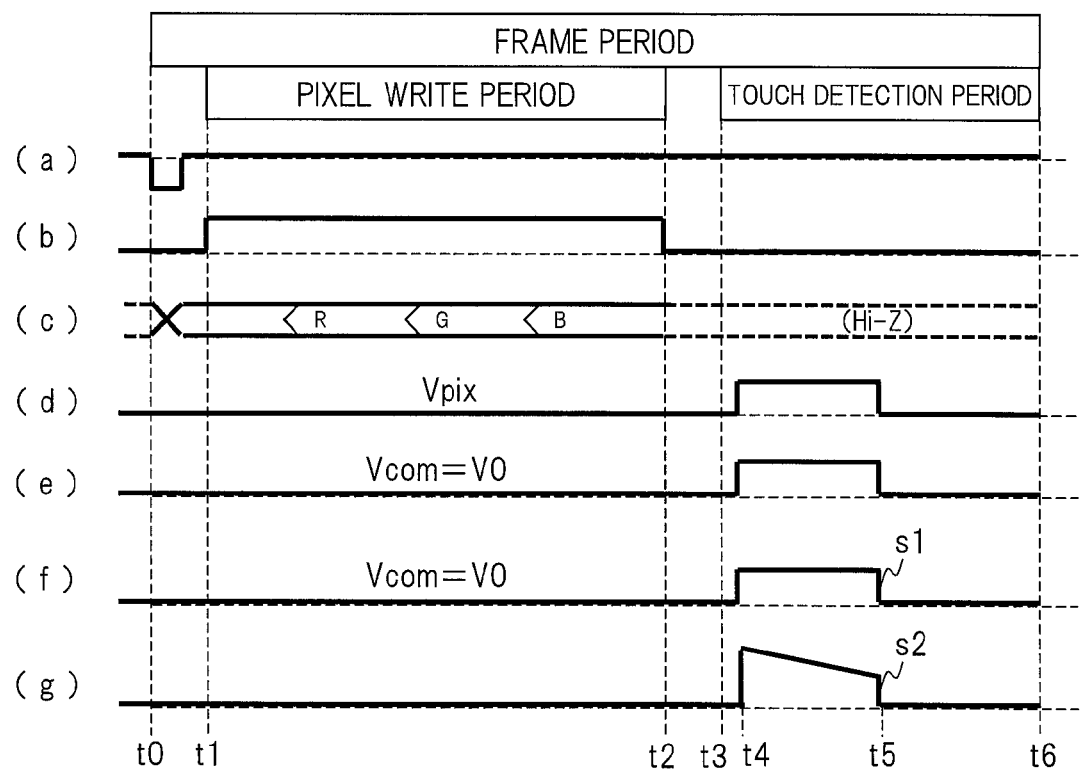
FIG. 22 is a diagram illustrating an example of drive control from a driver side in the second embodiment or others.

Structure examples of the touch sensor formed of the transmission-side electrode 71 and the reception-side electrode 72 can be those illustrated in FIGS. 18 and 19. Also, the structure of the liquid crystal display device equipped with the touch sensor including the liquid crystal touch panel 2 can be the structure illustrated in FIG. 17. Further, an example of drive control of the liquid crystal touch panel 2 including the transmission-side electrode 71 and the reception-side electrode 72 is illustrated in FIG. 22 described later.

Each of the upper electrode 31, the lower electrode 32, the transmission-side electrode 71, and the reception-side electrode 72 is configured of a transparent electrode made of ITO or others. In the second embodiment, a layer of the transmission-side electrode 71 is provided on an inner surface side of the glass substrate 21 included in the facing substrate 20, and a layer of the reception-side electrode 72 is provided on an outer surface side of the glass substrate 21 included in the facing substrate 20. And, the layer of the transmission-side electrode 71 and the layer of the reception-side electrode 72 are set to have the same potential as each other.

The transmission-side electrode 71 and the reception-side electrode 72 are elements configuring the touch sensor function, and configure the illustrated capacitance C between the transmission-side electrode 71 and the reception-side electrode 72. The touch sensor detects the touch/non-touch state or others by using the change in the capacitance C caused by the approach or the touch of the conductive body M such as a finger on the surface of the reception-side electrode 72 on the front surface side of the facing substrate 20. The state with touching is referred to as the ON state, and the state without touching is referred to as the OFF state.

Also, the transmission-side electrode 71 and the reception-side electrode 72 have not only the touch sensor function but also a function as the electrostatic protective layer as described by using FIG. 5 in the third modification example of the first embodiment. That is, the static electricity charged on the panel screen, in other words, on the front surface side of the facing substrate 20 can be discharged by the transmission-side electrode 71 and the reception-side electrode 72 via the transmission-side electrode 71 or the reception-side electrode 72 to the outside of the liquid crystal touch panel 2, that is, to the driver side or the ground.

In the image display, the lower electrode 32 and the transmission-side electrode 71 have the same potential as each other. Also, since the touch panel function is achieved by the transmission-side electrode 71 and the reception-side electrode 72, it is not necessary to maintain the same potential between the lower electrode 32 and the transmission-side electrode 71 during when the transmission-side electrode 71 is used, that is, during the application of the touch drive signal to the transmission-side electrode 71.

Note that the light-shielding film 22, the color filer 23, or others described in the second modification example of the first embodiment can be further added onto the facing substrate 20 side in addition to the liquid crystal touch panel 2A of the second embodiment. In this case, as similar to the second modification example of the first embodiment, the light-shielding film 22 may be included in the two types of layers to be provided with the same potential.

Also, as another aspect in the second embodiment, the lower electrode 32 and the reception-side electrode 72 may have the same potential as each other. Further, as still another aspect in the second embodiment, the lower electrode 32 and both of the transmission-side electrode 71 and the reception-side electrode 72 may have the same potential as each other.

Still further, the second embodiment shows a structure of a so-called in-cell type in which the transmission-side electrode 71 and the reception-side electrode 72 are mounted inside the facing substrate 20 of the liquid crystal panel. Meanwhile, as another example of the second embodiment, the touch panel function layer configured of the transmission-side electrode and the reception-side electrode may be adhered on the front surface side of the facing substrate 20. Also in this case, the transmission-side electrode or the reception-side electrode in the touch panel function layer can be one of the two types of layers to be provided with the same potential.

By the liquid crystal touch panel 2A of the second embodiment, the orientation of the liquid crystal is stabilized in the space between the lower electrode 32 and the transmission-side electrode 71 when the liquid crystal display function is used, that is, in the image display on the screen, so that such an effect that the transmittance is improved by the orientation stability of the liquid crystal can be obtained in the regions including the region including the transmission-side electrode 71 in the X-Y planar view. In other words, in the X-Y planar view, such an effect that the orientation of the liquid crystal is stabilized to improve the transmittance in the region where the transmission-side electrode 71 is formed and the region in the vicinity of the transmission-side electrode 71 can be obtained.

[Liquid Crystal Touch Panel of First Modification Example of Second Embodiment]

Figure 21:
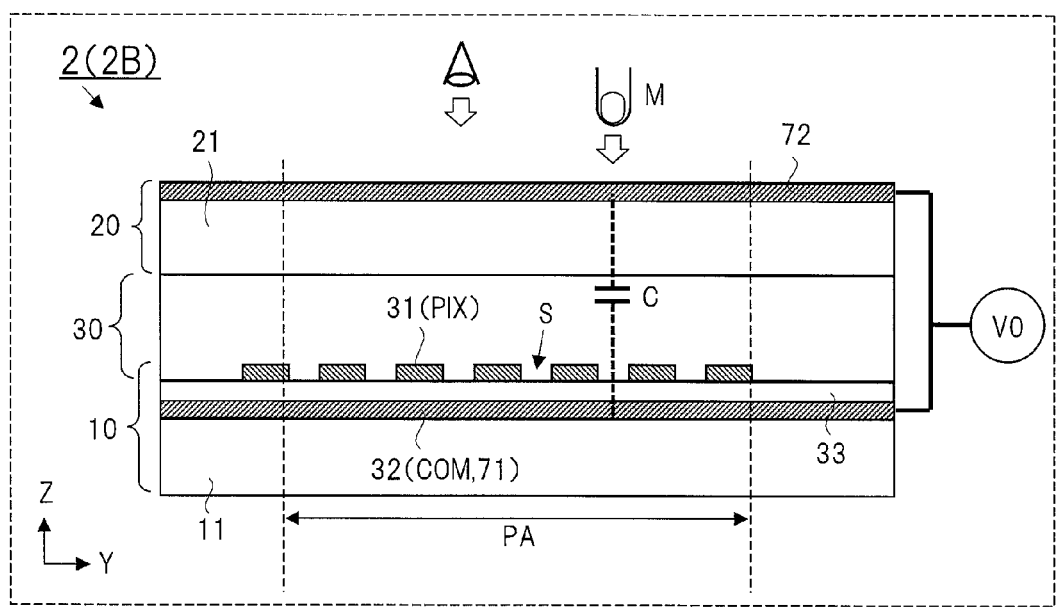
FIG. 21 is a diagram illustrating a schematic structure of a cross-sectional surface of a liquid crystal touch panel of a liquid crystal display device equipped with a touch sensor, which is a display device of a first modification example of the second embodiment.

FIG. 21 illustrates a schematic structure of a cross-sectional surface of the liquid crystal touch panel 2 of the liquid crystal display device equipped with the touch sensor which is the display device of the first modification example of the second embodiment. Note that the liquid crystal touch panel 2 of the first modification example of the second embodiment is particularly referred to as a liquid crystal touch panel 2B here. As similar to the second embodiment, while the liquid crystal touch panel 2B of the first modification example of the second embodiment includes the transmission-side electrode 71 and the reception-side electrode 72 configuring the touch panel function or the touch sensor function, the transmission-side electrode 71 on one hand is provided on the array substrate 10 side, and the reception-side electrode 72 is provided on the facing substrate 20 side. And, in the liquid crystal touch panel 2B of the first modification example of the second embodiment, the lower electrode 32 serving as the common electrode COM on the array substrate 10 side and the reception-side electrode 72 on the facing substrate 20 side have the same potential as each other. That is, in the liquid crystal touch panel 2B of the first modification example of the second embodiment, the reception-side electrode 72 is provided as the conductive layer similar to the conductive layer 60 (see FIG. 2) in the liquid crystal panel 1A of the first embodiment.

In the array substrate 10, a position in the Z direction where the transmission-side electrode 71 is provided is any position. That is, the transmission-side electrode 71 on the array substrate 10 side can be provided at any position in the Z direction. In the first modification example of the second embodiment, the lower electrode 32 serving as the common electrode COM and the transmission-side electrode 71 in the electrode layer including the upper electrode 31 and the lower electrode 32 of the array substrate 10 are commonly used and are functionally shared. And, in the liquid crystal touch panel 2B of the first modification example of the second embodiment, the reception-side electrode 72 and the lower electrode 32 serving as the common electrode COM and the transmission-side electrode 71 have the same potential as each other in a predetermined period.

In the facing substrate 20, a position in the Z direction where the reception-side electrode 72 is provided is any position. That is, the reception-side electrode 72 on the facing substrate 20 side can be provided at any position in the Z direction. In the first modification example of the second embodiment, the layer of the reception-side electrode 72 is provided on the front surface side of the facing substrate 20, that is, on an outer surface side on the glass substrate 21. As another aspect of the first modification example of the second embodiment, the layer of the reception-side electrode 72 may be provided on an inner surface side of the glass substrate 21 included in the facing substrate 20.

Also, as still another aspect of the first modification example of the second embodiment, the transmission-side electrode 71 may be provided on the facing substrate 20 side, and the reception-side electrode 72 may be provided on the array substrate 10 side. In this case, the lower electrode 32 and the transmission-side electrode 71 of the facing substrate 20 have the same potential as each other.

The lower electrode 32 serving as the common electrode COM provided on the array substrate 10 side has a structure in which at least a part of the lower electrode 32 is commonly used with the transmission-side electrode 71 so that they can be driven and controlled by a common voltage. For example, the lower electrode 32 serving as the common electrode COM is commonly used with the transmission-side electrode 71 by forming the lower electrode 32 as a solid layer as described in the second structure example of the touch sensor illustrated in FIG. 19. In other words, in one layer of the lower electrode 32, a function serving as the common electrode COM and a function serving as the transmission-side electrode 71 are commonly used. And, from the driver side, the signal, that is, the voltage for controlling the lower electrode 32 is supplied to the commonly-used layer when the liquid crystal display function is used, and the touch drive signal is supplied to the commonly-used layer when the touch sensor function is used. As a first modification example of the second embodiment, note that the first structure example of the touch sensor illustrated in FIG. 18 can be also used.

By the liquid crystal touch panel 2B of the first modification example of the second embodiment, as similar to the second embodiment, the orientation of the liquid crystal is stabilized in the space between the lower electrode 32 and the reception-side electrode 72 when the liquid crystal display function is used, so that such an effect that the transmittance is improved by the orientation stability of the liquid crystal in the regions including the region in the vicinity of the reception-side electrode 72 in the X-Y planar view is obtained. In other words, in the X-Y planar view, the orientation of the liquid crystal is stabilized in the region where the reception-side electrode 72 is formed and the region in the vicinity of the reception-side electrode 72, so that such an effect that the transmittance is improved is obtained.

[Manufacturing Method]

A method of manufacturing the liquid crystal touch panel 2 in the second embodiment can be similar to the method of manufacturing the liquid crystal panel 1 described in the first embodiment except for a point that the transmission-side electrode 71 and the reception-side electrode 72 are formed.

[Mounting Structure Example]

A mounting structure example of the display device including the liquid crystal touch panel 2 having the transmission-side electrode and the reception-side electrode of the second embodiment and the first modification example of the second embodiment can be similar to either of the first and second mounting structure examples described by using FIGS. 6 and 7 in the first embodiment.

The mounting structure example similar to the first mounting structure example described by using FIG. 6 corresponds to a case in which the reception-side electrode 72 serving as the conductive layer similar to the conductive layer 60 is provided on the outer surface side of the facing substrate 20 in the first modification example of the second embodiment. In the mounting structure example similar to the first mounting structure example, one end of the ITO pad 93 serving as the lower electrode 32 on the glass substrate 11 on the array substrate 10 side and one end of the ITO 91 serving as the conductive layer, that is, the reception-side electrode 72 on the glass substrate 21 on the facing substrate 20 side are connected to each other by the conductive paste 92 in an end region of the liquid crystal touch panel in the X or Y direction.

On the other hand, the mounting structure example similar to the second mounting structure example described by using FIG. 7 corresponds to a case in which the transmission-side electrode 71 serving as the conductive layer similar to the conductive layer 60 is provided on the inner surface side of the facing substrate 20 in the second embodiment. In the mounting structure example similar to the second mounting structure example, one end of the lower electrode 32 and one end of the conductive layer, that is, the transmission-side electrode 71 are electrically connected to each other by the conducting part 191 in the region FA serving as the frame part of the liquid crystal touch panel.

[Structure Example of Upper Electrode and Lower Electrode]

A structure example regarding the upper electrode 31 and the lower electrode 32 which are applicable to the second embodiment and the first modification example of the second embodiment can be similar to any of the structure examples described by using FIGS. 8 to 10 in the first embodiment.

[Planar Structure Example]

In the second embodiment and the first modification example of the second embodiment, a planar structure example of a pixel on an X-Y plane can be similar to any of the planar structure examples described by using FIGS. 11A to 11D in the first embodiment.

[Drive Control Example]

While the second embodiment and the first modification example of the second embodiment have the liquid crystal display function and the touch panel function, the liquid crystal display function and the touch panel function are controlled in, for example, time division as illustrated in the following drive control example. The same voltage V0 is applied to, for example, the lower electrode 32 and the transmission-side electrode 71 described above when the liquid crystal display function is used, that is, in the image display. When the touch panel function is used, a publicly-known touch detection process is performed.

FIG. 22 is a diagram illustrating an example of the drive control for the liquid crystal touch panel 2 by the driver side in the liquid crystal display device equipped with the touch sensor of the second embodiment and the first modification example of the second embodiment. FIG. 22 illustrates timing of a drive waveform serving as the example of the drive control for the liquid crystal touch panel 2. FIG. 22 illustrates the example of the drive control for supporting the driver structure illustrated in FIG. 17. In the present example of the drive control, a frame period is divided into a pixel write period and a touch detection period, and the liquid crystal display function and the touch sensor function are driven in the time division. Items (a) to (g) of FIG. 22 represent signals, that is, voltages, applied to the respective electrodes. Note that a drive frequency in each period can be appropriately designed. For example, it is assumed that the drive frequency in the pixel write period is set at 60 Hz and the drive frequency in the touch detection period is set at 120 Hz which is double the drive frequency in the pixel write period. In this case, the touch detection is performed in a ratio of twice with respect to the image display performed once. Also, an order of the pixel write period and the touch detection period may be reversed. Further, a plurality of pixel write periods and touch detection periods may exist in the frame period. For example, one the pixel write period and one touch detection period may exist in one horizontal period of the frame period.

The item (a) of FIG. 22 represents an HSYNC signal for defining the frame period. The item (b) of FIG. 22 represents a scan signal from the gate driver 111 (see FIG. 17) to the gate line 41. The item (c) of FIG. 22 represents a data signal from the data driver 112 (see FIG. 17) to the data line 42. The item (d) of FIG. 22 represents a signal containing a pixel voltage $V_{pix}$ to be applied from the upper/lower-electrode driver 113 (see FIG. 17) to the upper electrode 31 serving as the pixel electrode PIX in the case of the structure A. The item (e) of FIG. 22 represents a signal containing a common voltage $V_{com}$ to be applied from the upper/lower-electrode driver 113 to the lower electrode 32 serving as the common electrode COM in the case of the structure A. The item (f) of FIG. 22 represents a signal containing a voltage to be applied from the touch panel electrode driver 114 (see FIG. 17) to the transmission-side electrode 71. The item (g) of FIG. 22 represents a voltage to be applied from the touch panel electrode driver 114 to the reception-side electrode 72 and represents a signal to be outputted, that is, detected from the reception-side electrode 72 to the touch panel electrode driver 114.

In the pixel write period, that is, in the image display by the liquid crystal display function, as illustrated in the item (d) of FIG. 22, a predetermined pixel voltage $V_{pix}$ (whose illustration is omitted) for controlling the orientation of the liquid crystal by causing the fringe electric field in the liquid crystal layer 30 is applied to the upper electrode 31 serving as the pixel electrode PIX in accordance with the pixel transmittance.

Also, as illustrated in the items (e) and (f) of FIG. 22, the above-described same voltage V0 is applied as the common voltage $V_{com}$ to the lower electrode 32 serving as the common electrode COM and the transmission-side electrode 71 described above. In this manner, in the pixel write period, the lower electrode 32 and the transmission-side electrode 71 are controlled so as to have the same potential as each other, so that the orientation stability of the liquid crystal is enhanced. Also to the reception-side electrode 72, the common voltage $V_{com}$ is applied as similar to, for example, the lower electrode 32 and the transmission-side electrode 71.

In the touch detection period, that is, in the touch detection by the touch panel function, in the item (f) of FIG. 22, the input signal s1 serving as a touch drive signal is inputted from the touch panel electrode driver 114 to the transmission-side electrode 71. On the other hand, in the item (g) of FIG. 22, the output signal s2 serving as a touch detection signal is outputted, that is, detected. In accordance with the input signal s1 in the item (f) of FIG. 22, the same waveform, that is, potential as that of the input signal s1 is obtained also in the items (d) and (e) of FIG. 22.

[Regarding Method of Driving Liquid Crystal]

In the liquid crystal touch panel 2 of any of the second embodiment and the first modification example of the second embodiment, the opening 50 including the plurality of slits S is formed in the electrode layer including the upper electrode 31 and the lower electrode 32 as described in the first embodiment by using FIGS. 8 to 10 and 11A to 11D. As described in the first embodiment by using FIGS. 7 to 9 and 11A to 11D, the slits S extends in the transverse direction corresponding to the horizontal direction of the screen, that is, in the X direction. The high-speed transverse electric field mode which is the method of driving the liquid crystal for supporting the electrode layer and the opening 50 is a method of achieving high-speed responsiveness and others by the orientation process for the anti-parallel orientation in accordance with the X direction which is the extending direction of the slits S. While this high-speed transverse electric field mode will be described later, and this is similar to the high-speed transverse electric field mode described in the first embodiment by using FIGS. 13 to 15.

In the second embodiment and the first modification example of the second embodiment, the liquid crystal touch panel 2 is configured by adding a touch panel function in addition to the liquid crystal display function with the high-speed transverse electric field mode by the electrode layer and the opening 50 described above. In such a case, a task for the orientation stability of the liquid crystal of the liquid crystal layer is caused. That is, in order to achieve the favorable orientation stability of the liquid crystal of the liquid crystal display function and others, there are tasks how to configure the transmission-side electrode 71, the reception-side electrode 72, and others for the liquid crystal panel and how to drive to control the transmission-side electrode 71 and the reception-side electrode 72.

Accordingly, in the liquid crystal touch panel 2 of the second embodiment and the first modification example of the second embodiment, the two types of layers also including the transmission-side electrode 71 and the reception-side electrode 72 forming the touch panel function, such as the lower electrode 32 and the transmission-side electrode 71 are controlled so as to have the same potential as each other. In this manner, the orientation of the liquid crystal of the liquid crystal layer 30 can be stabilized. And, in addition to the achievement of the touch panel function, the response speed or others in the pixel display when the liquid crystal display function is used can be increased, so that the display quality can be enhanced. In other words, the degradation of the display quality and others caused by adding the touch panel function formed of the transmission-side electrode 71 and the reception-side electrode 72 to the liquid crystal panel can be prevented or reduced.

[High-Speed Transverse Electric Field Mode]

The orientation state of the liquid crystal of the liquid crystal layer 30 in the high-speed transverse electric field mode in the second embodiment and the first modification example of the second embodiment is similar to the orientation state of the liquid crystal of the liquid crystal layer 30 in the high-speed transverse electric field mode described in the first embodiment by using FIGS. 13 to 15. Therefore, also in the second embodiment and the first modification example of the second embodiment, as similar to the first embodiment, the pixel response speed obtained when the voltage is applied to the upper electrode 31 and the lower electrode 32 is increased by this high-speed transverse electric field mode, so that the display quality is enhanced.

[Effects and Others]

As described above, according to the liquid crystal display device of each embodiment, in addition to the wide viewing angle, the high aperture ratio, and others, it is possible to improve the response speed, the display quality, and others can be improved more than those of the conventional FFS mode or others. That is, according to the liquid crystal display device of each embodiment, the liquid crystal display device with the high-speed transverse electric field mode can be provided. In other words, according to the liquid crystal display device of each embodiment, the orientation stability of the liquid crystal in the pixel and on the screen can be improved, and the response speed, brightness, or others can be improved, so that the display quality can be improved.

In the foregoing, the invention made by the present inventor has been concretely described based on the embodiments. However, it is needless to say that the present invention is not limited to the foregoing embodiments and various modifications and alterations can be made within the scope of the present invention. For example, various modification examples as described below are possible for the shape of the opening 50 formed of the upper electrode 31 and the lower electrode 32.

(1) The shapes of the slits S and the comb teeth can be various shapes such as a rectangular, a trapezoidal, and a triangular shape. For example, the shape may be a triangular shape by setting a width of an upper side of the trapezoidal shape of each of the comb teeth K to be 0.

(2) In the structure α, the slits S on both sides in the X direction of the longitudinal-direction slit 57 extending in the Y direction may not be arranged alternately in the Y direction of the longitudinal-direction slit 57 but may be arranged at the same position in the Y direction. That is, the comb teeth K on both sides of the longitudinal-direction electrode part 58 extending in the Y direction may not be arranged alternately in the Y direction of the longitudinal-direction slit 58 but may be arranged at the same position in the Y direction. Also, the degree of the shift in the case of the alternate shift arrangement is not limited to ½ of the pitch of the slits S in the Y direction. Alternatively, not only each length of the slits S on both sides in the X direction of the longitudinal-direction slit 57 extending in the Y direction but also each width and each pitch of the slits S in the Y direction may be varied. That is, not only each length of the comb teeth K on both sides in the X direction of the longitudinal-direction electrode part 58 extending in the Y direction but also each width and each pitch of the comb teeth K in the Y direction may be varied.

(3) The slits S of the opening 50 may be provided so that the extending direction of the slits S is tilted by a predetermined angle such as 5 degrees from the X direction in the planar view. Also, two or more types of the slits S whose extending directions are tilted by different angles from each other from the X direction may be provided to be mixed inside the pixel.

(4) Throughout the present specification, note that the pixel electrode PIX is taken as the upper electrode 31 and the common electrode COM is taken as the lower electrode 32. However, a vertically-structured relation between the pixel electrode PIX and the common electrode COM is not limited to this. The common electrode COM may be formed on the pixel electrode PIX via an insulating film.

(5) Further, the common electrode COM and the conductive layer 60 may not necessarily have the same potential as each other. However, when the common electrode COM is formed on the pixel electrode PIX as described in the item (4), it is more preferred that the common electrode COM and the conductive layer 60 have different potentials from each other.

The present invention can be used for a liquid crystal display device or others including a liquid crystal touch panel or others.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
an electrode layer being provided above a first substrate and including a first electrode and a second electrode, the second electrode facing the first electrode and having an opening formed therein including a plurality of slits whose extending directions are the same as each other;
a liquid crystal layer being provided between the first substrate and a second substrate facing the first substrate and having liquid crystal molecules oriented as rotating in reverse to each other in vicinity regions on one side and the other side of the opening which face each other in a width direction; and
a conductive layer being provided above the second substrate,
wherein the conductive layer is formed in a lattice form which sections pixels in accordance with pixel alignment when seen in a plan view,
the display device further includes:
a first orientation film being provided between the first substrate and the liquid crystal layer and being subjected to an orientation process in a first orientation direction which is along an extending direction of the slits; and a second orientation film being provided between the second substrate and the liquid crystal layer and being subjected to an orientation process in a second orientation direction which is along a first orientation direction of the first orientation film, in an initial orientation state of the liquid crystal layer, long axes of the liquid crystal molecules are aligned in the first orientation direction, when a short side direction of a pixel having a rectangle is set to a first direction, a long side direction of the pixel is set to a second direction, and a direction orthogonal to both of the first direction and the second direction is set to a third direction, for each pixel, the opening includes:
  a communication opening extending in the second direction;
  a plurality of first slits each connected to one side of the communication opening in the first direction and each extending in the first direction; and
  a plurality of second slits each connected to the other side of the communication opening in the first direction and each extending in the first direction, the first slits and the second slits are alternately arranged so that their positions are shifted from each other in the second direction, the second electrode includes a first side extending in the first direction, a second side which extends in the first direction and which is adjacent to the first side through the first slit, a third side extending in the first direction, and a fourth side which extends in the first direction and which is adjacent to the third side through the second slit, each of the first side, the second side, the third side, and the fourth side does not intersect the communication opening, and in application of the voltage to the first electrode and the second electrode, the long axes of the liquid crystal molecules are oriented as rotating in an in-plane direction of a substrate so that the liquid crystal molecules rotate clockwise in a vicinity region including the first side of the first and second sides of the first electrode forming each of the slits and the liquid crystal molecules rotate counterclockwise in a vicinity region including the second side thereof.

2. The display device according to claim 1,
wherein, when orientation of liquid crystal of the liquid crystal layer is controlled, the conductive layer has the same potential as a potential of the first electrode or the second electrode.

3. The display device according to claim 1,
wherein the first electrode is a common electrode,
the second electrode is a pixel electrode arranged so as to be closer to the liquid crystal layer than the first electrode, and
the conductive layer has the same potential as a potential of the first electrode when orientation of liquid crystal of the liquid crystal layer is controlled.

4. The display device according to claim 1,
wherein the first electrode is a pixel electrode,
the second electrode is a common electrode arranged so as to be closer to the liquid crystal layer than the first electrode, and the conductive layer has the same potential as a potential of the second electrode when orientation of liquid crystal of the liquid crystal layer is controlled.

5. The display device according to claim 1,
wherein the second substrate has a transmission-side electrode and a reception-side electrode which are electrodes for configuring a touch sensor function as the conductive layer, and
the first electrode or the second electrode has the same potential as a potential of the transmission-side electrode or the reception-side electrode when orientation of liquid crystal of the liquid crystal layer is controlled.

6. The display device according to claim 5,
wherein the display device further includes:
a first driver connected to a first electrode line for configuring a pixel;
a second driver connected to a second electrode line for configuring a pixel;
a third driver connected to the second electrode and the first electrode;
a fourth driver connected to the transmission-side electrode and the reception-side electrode; and
a controller for controlling the first to fourth drivers.

7. The display device according to claim 1,
wherein the second substrate has one electrode of a transmission-side electrode and a reception-side electrode which are electrodes for configuring a touch sensor function as the conductive layer,
the first substrate has the other electrode of the transmission-side electrode and the reception-side electrode, and
the first electrode or the second electrode has the same potential as a potential of the one electrode of the transmission-side electrode and the reception-side electrode when orientation of liquid crystal of the liquid crystal layer is controlled.

8. The display device according to claim 1,
wherein the conductive layer is an electrostatic protective layer.

9. The display device according to claim 1,
wherein the display device further includes:
a first drive circuit part connected to the electrode layer; and
a second drive circuit part connected to the conductive layer, and,
in a pixel write period in image display, a first voltage is applied from the first drive circuit part to either the second electrode or the first electrode, and besides, the first voltage is applied from the second drive circuit part to the conductive layer.

10. The display device according to claim 1,
wherein the display device further includes
a drive circuit part connected to the first substrate or the second substrate, and
a first end of the first electrode or the second electrode extending to an end of the first substrate and a second end of the conductive layer extending to an end of the second substrate are connected to each other by a conductive material, and a first voltage is applied from the drive circuit part to the first end or the second end.

11. The display device according to claim 1,
wherein the display device further includes:
a drive circuit part connected to the first substrate or the second substrate; and
a sealing part which connects between the first substrate and the second substrate and seals liquid crystal of the liquid crystal layer, and a first end of the first electrode or the second electrode and a second end of the conductive layer are connected to each other by a conductive material at a position inside the sealing part itself or inner than the sealing part, and a first voltage is applied from the drive circuit part to the first end or the second end.

12. The display device according to claim 1, wherein,
one long side of each of the first slits and one long side of each of the second slits are aligned on a straight line extending in the first direction.

13. The display device according to claim 1, wherein the display device further includes:
a first driver connected to a first electrode line for configuring a pixel;
a second driver connected to a second electrode line for configuring a pixel;
a third driver connected to the second electrode and the first electrode; and
a controller for controlling the first to third drivers.

14. An electronic apparatus comprising:
the display device according to claim 13; and
a control unit for performing a display control process to the display device; and
a storage unit for storing display data to be provided to the display device.

* * * * *